United States Patent
Ogata et al.

(10) Patent No.: US 10,361,458 B2
(45) Date of Patent: *Jul. 23, 2019

(54) LAMINATED BODY

(71) Applicant: Sumitomo Chemical Company, Limited, Tokyo (JP)

(72) Inventors: Toshihiko Ogata, Osaka (JP); Chikara Murakami, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 26 days.

This patent is subject to a terminal disclaimer.

(21) Appl. No.: 15/627,671

(22) Filed: Jun. 20, 2017

(65) Prior Publication Data
US 2017/0365878 A1 Dec. 21, 2017

(30) Foreign Application Priority Data

Jun. 21, 2016 (JP) ................. 2016-123056

(51) Int. Cl.
| | |
|---|---|
| *H01M 2/02* | (2006.01) |
| *H01M 2/14* | (2006.01) |
| *H01M 2/16* | (2006.01) |
| *H01M 4/02* | (2006.01) |
| *H01M 10/42* | (2006.01) |
| *C09D 127/16* | (2006.01) |
| *H01M 10/052* | (2010.01) |
| *H01M 10/0565* | (2010.01) |

(52) U.S. Cl.
CPC ...... *H01M 10/0565* (2013.01); *C09D 127/16* (2013.01); *H01M 2/0287* (2013.01); *H01M 2/145* (2013.01); *H01M 2/16* (2013.01); *H01M 2/166* (2013.01); *H01M 2/1646* (2013.01); *H01M 2/1653* (2013.01); *H01M 2/1686* (2013.01); *H01M 10/4235* (2013.01); *C01P 2002/04* (2013.01); *H01M 10/052* (2013.01); *H01M 2004/021* (2013.01); *H01M 2300/0017* (2013.01); *H01M 2300/0094* (2013.01)

(58) Field of Classification Search
CPC .................................................. H01M 2/1686
See application file for complete search history.

(56) References Cited

U.S. PATENT DOCUMENTS

| | | | |
|---|---|---|---|
| 3,931,446 A | 1/1976 | Murayama et al. | |
| 5,051,183 A | 9/1991 | Takita et al. | |
| 7,208,555 B2 | 4/2007 | Tada et al. | |
| 8,931,647 B2 | 1/2015 | Shiki et al. | |
| 9,508,975 B1* | 11/2016 | Matsuo | H01M 2/1653 |
| 10,074,840 B2 | 9/2018 | Honda et al. | |
| 2006/0014912 A1 | 1/2006 | Araki et al. | |
| 2007/0072069 A1 | 3/2007 | Yamada et al. | |
| 2007/0092705 A1 | 4/2007 | Lee et al. | |
| 2007/0190334 A1 | 8/2007 | Araki et al. | |
| 2007/0232709 A1 | 10/2007 | Lee et al. | |
| 2009/0101600 A1 | 4/2009 | Shiki et al. | |
| 2009/0111025 A1 | 4/2009 | Lee et al. | |
| 2009/0148659 A1 | 6/2009 | Ishiodori et al. | |
| 2010/0285341 A1 | 11/2010 | Yun et al. | |
| 2011/0212358 A1* | 9/2011 | Usami | B32B 5/32 429/145 |
| 2011/0305940 A1* | 12/2011 | Usami | B29C 44/04 429/144 |
| 2013/0089770 A1 | 4/2013 | Nishikawa | |
| 2013/0095365 A1 | 4/2013 | Nishikawa | |
| 2013/0196208 A1 | 8/2013 | Nemoto | |
| 2014/0178741 A1 | 6/2014 | Hasegawa et al. | |
| 2014/0272505 A1* | 9/2014 | Yoon | H01M 2/1646 429/94 |
| 2014/0363726 A1 | 12/2014 | Honda et al. | |
| 2015/0180002 A1* | 6/2015 | Nishikawa | H01M 2/1686 429/144 |
| 2015/0188108 A1 | 7/2015 | Miyazawa et al. | |

(Continued)

FOREIGN PATENT DOCUMENTS

| | | |
|---|---|---|
| CN | 1933923 A | 3/2007 |
| EP | 0834941 A1 | 4/1998 |

(Continued)

OTHER PUBLICATIONS

Office Action dated Aug. 18, 2017 in KR Application No. 10-2017-0041611.
Office Action dated Aug. 18, 2017 in KR Application No. 10-2017-0041366.
Mohammadi et al., "Effect of Tensile Strain Rate and Elongation on Crystalline Structure and Piezoelectric Properties of PVDF Thin Films", Polymer Testing, vol. 26, pp. 42-50 (2007).
Office Action dated Aug. 18, 2017 in KR Application No. 10-2017-0041595.
Office Action dated Jul. 29, 2016 in KR Application No. 1020160077240.
Office Action dated Jun. 28, 2016 in JP Application No. 2016024163.
Office Action dated Nov. 29, 2016 in JP Application No. 2016-024163.

(Continued)

Primary Examiner — Matthew J Merkling
(74) Attorney, Agent, or Firm — Panitch Schwarze Belisario & Nadel LLP

(57) ABSTRACT

A laminated body includes: a porous base material containing a polyolefin-based resin as a main component; and a porous layer which is disposed on at least one surface of the porous base material and which contains a polyvinylidene fluoride-based resin, the laminated body being arranged so that: a diminution rate of diethyl carbonate dropped on the porous base material is 15 sec/mg to 21 sec/mg; a spot diameter of the diethyl carbonate 10 seconds after the diethyl carbonate was dropped on the porous base material is not less than 20 mm; and the polyvinylidene fluoride-based resin containing crystal form α in an amount of not less than 36 mol % with respect to 100 mol % of a total amount of the crystal form α and crystal form β contained in the polyvinylidene fluoride-based resin. A nonaqueous electrolyte secondary battery separator made of the laminated body is not easily curled.

7 Claims, No Drawings

(56) References Cited

U.S. PATENT DOCUMENTS

| | | |
|---|---|---|
| 2015/0263325 A1 | 9/2015 | Honda et al. |
| 2017/0033347 A1 | 2/2017 | Murakami et al. |
| 2017/0033348 A1 | 2/2017 | Murakami et al. |
| 2017/0036832 A1 | 2/2017 | Omura et al. |
| 2017/0098809 A1* | 4/2017 | Ogata .................. H01M 2/1653 |
| 2017/0141373 A1 | 5/2017 | Murakami et al. |
| 2017/0170443 A1 | 6/2017 | Murakami et al. |
| 2017/0365831 A1 | 12/2017 | Ogata et al. |
| 2017/0365832 A1 | 12/2017 | Ogata et al. |
| 2017/0365832 A1 | 12/2017 | Ogata et al. |
| 2017/0365833 A1 | 12/2017 | Ogata et al. |
| 2017/0365834 A1 | 12/2017 | Ogata et al. |
| 2017/0365878 A1 | 12/2017 | Ogata et al. |

FOREIGN PATENT DOCUMENTS

| | | |
|---|---|---|
| JP | S5117274 A | 2/1976 |
| JP | H06-104736 B2 | 12/1994 |
| JP | H1140129 A | 2/1998 |
| JP | H1186844 A | 3/1999 |
| JP | H11300180 A | 11/1999 |
| JP | 2001-118558 A | 4/2001 |
| JP | 2005179562 A | 7/2005 |
| JP | 2005200623 A | 7/2005 |
| JP | 2005343957 A | 12/2005 |
| JP | 2008062229 A | 3/2008 |
| JP | 4247027 B2 | 4/2009 |
| JP | 2009104967 A | 5/2009 |
| JP | 2009185093 A | 8/2009 |
| JP | 2009-256404 A | 11/2009 |
| JP | 2010-540744 A | 12/2010 |
| JP | 201346998 A | 3/2013 |
| JP | 5355823 B1 | 11/2013 |
| JP | 5432417 B2 | 3/2014 |
| JP | 5553165 B2 | 7/2014 |
| JP | 2015111461 A | 6/2015 |
| JP | 2016-040354 A | 3/2016 |
| JP | 2016-051695 A | 4/2016 |
| JP | 5932161 B2 | 6/2016 |
| KR | 20060072065 A | 6/2006 |
| KR | 10-2006-0101541 A | 9/2006 |
| KR | 20060118668 A | 11/2006 |
| KR | 10-2009-0037552 A | 4/2009 |
| KR | 10-2013-0031319 A | 3/2013 |
| KR | 10-2013-0036043 A | 4/2013 |
| KR | 10-1430975 B1 | 8/2014 |
| KR | 10-2014-0113186 A | 9/2014 |
| KR | 20140112668 A | 9/2014 |
| KR | 101479749 B1 | 1/2015 |
| KR | 20150020667 A | 2/2015 |
| KR | 10-1510972 B1 | 4/2015 |
| KR | 10-2016-0002173 A | 1/2016 |
| KR | 20160038918 A | 4/2016 |
| WO | 2007119850 A1 | 10/2007 |
| WO | 2008018181 A1 | 2/2008 |
| WO | 2012137375 A1 | 10/2012 |
| WO | 2013073503 A1 | 5/2013 |
| WO | 2013099539 A1 | 7/2013 |
| WO | 2016152863 A1 | 9/2016 |

OTHER PUBLICATIONS

Office Action dated Dec. 21, 2016 in KR Application No. 10-2016-0077240.
Office Action dated Apr. 19, 2017 in KR Application No. 10-2016-0077240.
Martins et al, "Electroactive Phases of Poly(Vinylidene Fluoride): Determination, Processing, and Applications," Progress in Polymer Science, vol. 39, pp. 683-706 (2014).
Office Action dated May 16, 2017 in JP Application No. 2017033720.
Office Action dated Mar. 28, 2018 in CN Application No. 201610865635.7.
Office Action dated Oct. 22, 2018 in U.S. Appl. No. 15/627,556 by Ogata.
Office Action dated Oct. 22, 2018 in U.S. Appl. No. 15/627,664 by Ogata.
Office Action dated Aug. 18, 2017 KR Application No. 10-2017-0041604.
Office Action dated Aug. 18, 2017 KR Application No. 10-2017-0041611.
Office Action dated Sep. 20, 2018 in U.S. Appl. No. 15/627,629, by Ogata.
Office Action dated Dec. 20, 2018 in U.S. Appl. No. 15/627,585, by Ogata.
Office Action dated Dec. 31, 2018 in U.S. Appl. No. 15/627,736, by Ogata.
Office Action dated Apr. 10, 2019 in U.S. Appl. No. 15/627,585, by Ogata.

* cited by examiner

LAMINATED BODY

This Nonprovisional application claims priority under 35 U.S.C. §119 on Patent Application No. 2016-123056 filed in Japan on Jun. 21, 2016, the entire contents of which are hereby incorporated by reference.

TECHNICAL FIELD

The present invention relates to a laminated body, and more specifically, to a laminated body usable as a separator for a nonaqueous electrolyte secondary battery (hereinafter referred to as a "nonaqueous electrolyte secondary battery separator").

BACKGROUND ART

Nonaqueous electrolyte secondary batteries, particularly lithium-ion secondary batteries, have a high energy density, and are therefore in wide use as batteries for a personal computer, a mobile telephone, a portable information terminal, and the like. Such nonaqueous electrolyte secondary batteries have recently been developed as on-vehicle batteries.

In a nonaqueous electrolyte secondary battery, the electrodes expand and contract repeatedly as the nonaqueous electrolyte secondary battery is charged and discharged. The electrodes and the separator thus cause stress on each other. This, for example, causes the electrode active materials to be lost and consequently increases the internal resistance, unfortunately resulting in a degraded cycle characteristic. In view of that, there has been proposed a technique of coating the surface of a separator with an adhesive material such as polyvinylidene fluoride for increased adhesiveness between the separator and electrodes (see Patent Literatures 1 and 2). Coating a separator with an adhesive material, however, has been causing the separator to curl visibly. A curled separator cannot be handled easily during production, which may unfortunately lead to problems during battery preparation such as defective rolling and defective assembly.

CITATION LIST

Patent Literature

[Patent Literature 1]
Japanese Patent No. 5355823 (Publication Date: Nov. 27, 2013)
[Patent Literature 2]
Japanese Patent Application Publication, Tokukai, No. 2001-118558 (Publication Date: Apr. 27, 2001)

SUMMARY OF INVENTION

Technical Problem

The present invention has been accomplished in view of the above issue. It is an object of the present invention to sufficiently prevent a separator from curling.

Solution to Problem

The inventors of the present invention have discovered that a nonaqueous electrolyte secondary battery capable of sufficiently preventing curls can be produced by using, as a separator, a laminated body including (i) a porous base material containing a polyolefin-based resin as a main component and (ii) a porous layer disposed on the porous base material which porous layer contains a polyvinylidene fluoride-based resin (hereinafter also referred to as "PVDF-based resin"), the polyvinylidene fluoride-based resin having moderately controlled crystal forms. The inventors of the present invention have also discovered that a nonaqueous electrolyte secondary battery having excellent battery characteristics, particularly an excellent discharge rate characteristic and an excellent cycle characteristic, can be produced by controlling an electrolyte-retaining property of a porous base material.

The present invention can cover in its scope the laminated body, nonaqueous electrolyte secondary battery member, and nonaqueous electrolyte secondary battery below.

A laminated body in accordance with an embodiment of the present invention is a laminated body includes: a porous base material containing a polyolefin-based resin as a main component; and a porous layer in which disposed on at least one surface of the porous base material and which contains a polyvinylidene fluoride-based resin, the laminated body being arranged so that:

a diminution rate of diethyl carbonate dropped on the porous base material is 15 sec/mg to 21 sec/mg;

a spot diameter of the diethyl carbonate 10 seconds after the diethyl carbonate was dropped on the porous base material is not less than 20 mm; and the polyvinylidene fluoride-based resin containing crystal form $\alpha$ in an amount of not less than 36 mol % with respect to 100 mol % of a total amount of the crystal form $\alpha$ and crystal form $\beta$ contained in the polyvinylidene fluoride-based resin, where the amount of the crystal form $\alpha$ is calculated from an absorption intensity at around 765 $cm^{-1}$ in an IR spectrum of the porous layer, and an amount of the crystal form $\beta$ is calculated from an absorption intensity at around 840 $cm^{-1}$ in the IR spectrum of the porous layer.

The laminated body in accordance with an embodiment of the present invention is preferably arranged so that:

the polyvinylidene fluoride-based resin includes (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

The laminated body in accordance with an embodiment of the present invention is preferably arranged so that:

the polyvinylidene fluoride-based resin has a weight-average molecular weight of 200,000 to 3,000,000.

The laminated body in accordance with an embodiment of the present invention is preferably arranged so that:

the porous layer contains a filler.

The laminated body in accordance with an embodiment of the present invention is preferably arranged so that the filler has a volume-average particle size of 0.01 µm to 10 µm.

A nonaqueous electrolyte secondary battery member in accordance with an embodiment of the present invention includes a cathode, the laminated body in accordance with an embodiment of the present invention, and an anode that are arranged in this order.

A nonaqueous electrolyte secondary battery in accordance with an embodiment of the present invention includes the laminated body in accordance with an embodiment of the present invention as a separator.

Advantageous Effects of Invention

A laminated body in accordance with an embodiment of the present invention is not easily curled.

DESCRIPTION OF EMBODIMENTS

The following description will discuss an embodiment of the present invention in detail. Note that numerical expressions such as "A to B" herein mean "not less than A and not more than B".

Embodiment 1: Laminated Body

A laminated body in accordance with Embodiment 1 of the present invention includes: a porous base material containing a polyolefin-based resin as a main component; and a porous layer on at least one surface of the porous base material, the porous layer containing a polyvinylidene fluoride-based resin, the laminated body being arranged so that:

a diminution rate of diethyl carbonate dropped on the porous base material is 15 sec/mg to 21 sec/mg; a spot diameter of the diethyl carbonate 10 seconds after the diethyl carbonate was dropped on the porous base material is not less than 20 mm; and the polyvinylidene fluoride-based resin containing crystal form $\alpha$ in an amount of not less than 36 mol % with respect to 100 mol % of a total amount of the crystal form $\alpha$ and crystal form $\beta$ contained in the polyvinylidene fluoride-based resin,
where the amount of the crystal form $\alpha$ is calculated from an absorption intensity at around 765 cm$^{-1}$ in an IR spectrum of the porous layer, and an amount of the crystal form $\beta$ is calculated from an absorption intensity at around 840 cm$^{-1}$ in the IR spectrum of the porous layer.

<Porous Base Material>

A porous base material in accordance with an embodiment of the present invention is a base material for a laminated body in accordance with an embodiment of the present invention, and contains polyolefin as a main component. The porous base material contains a large number of pores connected to one another, and allows a gas or a liquid to pass therethrough from one surface to the other. The porous base material may include a single layer or a plurality of layers.

The expression "containing a polyolefin-based resin as a main component" means that a polyolefin-based resin accounts for not less than 50% by volume, preferably not less than 90% by volume, more preferably not less than 95% by volume, of the entire porous base material. The polyolefin-based resin more preferably contains a high molecular weight component having a weight-average molecular weight of $5\times10^5$ to $15\times10^6$. In particular, the polyolefin more preferably contains a high molecular weight component having a weight-average molecular weight of not less than 1,000,000 because a laminated body including such a porous base material and a nonaqueous electrolyte secondary battery separator made of such a laminated body each have a higher strength.

Examples of the polyolefin-based resin which is a main component of the porous base material include, but are not particularly limited to, homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, and 1-hexene (which are thermoplastic resins). Among the above examples, polyethylene is preferable as it is capable of preventing (shutting down) a flow of an excessively large electric current at a lower temperature. Examples of the polyethylene include low-density polyethylene, high-density polyethylene, linear polyethylene (ethylene-$\alpha$-olefin copolymer), and ultra-high molecular weight polyethylene having a weight-average molecular weight of not less than 1,000,000. Among these examples, ultra-high molecular weight polyethylene having a weight-average molecular weight of not less than 1,000,000 is further preferable.

A thickness of the porous base material can be decided as appropriate in view of a thickness of a laminated body including the porous base material, and is preferably 4 μm to 40 μm, and more preferably 5 μm to 20 μm.

If the thickness of the porous base material is smaller than the above range, a nonaqueous electrolyte secondary battery including, as a nonaqueous electrolyte secondary battery separator, a laminated body including the porous base material will not be capable of sufficiently preventing an internal short circuit caused by, for example, breakage of the nonaqueous electrolyte secondary battery. Further, such a porous base material can retain only a smaller amount of electrolyte. If the thickness of the porous base material is larger than the above range, a laminated body including the porous base material, which is usable as a nonaqueous electrolyte secondary battery separator, will have an increased resistance to permeation of lithium ions over the entire region of the laminated body. Thus, in such a nonaqueous electrolyte secondary battery including, as a nonaqueous electrolyte secondary battery separator, a laminated body including the porous base material, the cathode is degraded as the nonaqueous electrolyte secondary battery repeats a charge and discharge cycle, with the result of a degraded discharge rate characteristic and/or a degraded cycle characteristic. Further, such a porous layer will increase the distance between the cathode and the anode, with the result of a larger nonaqueous electrolyte secondary battery.

The porous base material only needs to have a weight per unit area which weight is appropriately determined in view of the strength, thickness, weight, and handleability of the laminated body including the porous base material, which is usable as a nonaqueous electrolyte secondary battery separator. Specifically, the porous base material ordinarily has a mass per unit area of preferably 4 g/m$^2$ to 20 g/m$^2$, more preferably 5 g/m$^2$ to 12 g/m$^2$, so as to allow the battery, which includes a laminated body including the porous base material as a nonaqueous electrolyte secondary battery separator, to have a higher weight energy density and a higher volume energy density.

The porous base material has an air permeability of preferably 30 sec/100 mL to 500 sec/100 mL, more preferably 50 sec/100 mL to 300 sec/100 mL, in terms of Gurley values. A porous base material having such an air permeability allows a laminated body including the porous base material, which is usable as a nonaqueous electrolyte secondary battery separator, to achieve sufficient ion permeability.

The porous base material has a porosity of preferably 20% by volume to 80% by volume, more preferably 30% by volume to 75% by volume, so as to (i) retain a larger amount of electrolyte and (ii) obtain the function of reliably preventing (shutting down) a flow of an excessively large electric current at a lower temperature.

If the porosity of the porous base material is less than 20% by volume, the porous base material will have an increased resistance. If the porosity of the porous base material is more than 80% by volume, the porous base material will have a decreased mechanical strength.

Further, in order for a laminated body including the porous base material, which is usable as a nonaqueous electrolyte secondary battery separator, to obtain sufficient ion permeability and prevent particles from entering the cathode and/or the anode when the laminated body is used as a nonaqueous electrolyte secondary battery separator, the porous base material has pores each having a pore size of preferably not larger than 0.3 μm, more preferably not larger than 0.14 μm.

A diminution rate, by which diethyl carbonate (hereinafter also referred to as "DEC") dropped on the porous base material in accordance with an embodiment of the present invention diminishes, is 15 sec/mg to 21 sec/mg, preferably 16 sec/mg to 20 sec/mg, and more preferably 17 sec/mg to 19 sec/mg.

If the diminution rate of diethyl carbonate dropped on the porous base material is less than 15 sec/mg, then it means that a liquid retention property of the porous base material is poor in a case where a nonaqueous electrolyte secondary battery is constituted by using a laminated body, which includes the porous base material, as a nonaqueous electrolyte secondary battery separator or as a member of the nonaqueous electrolyte secondary battery separator. This causes the inside of the nonaqueous electrolyte secondary battery to dry out, and therefore causes deterioration the cycle characteristic of the nonaqueous electrolyte secondary battery. If the diminution rate of diethyl carbonate dropped on the porous base material is more than 21 sec/mg, then it means that a fluid (an electrolyte such as DEC or a gas generated from an electrolyte in the battery during battery charge and discharge) in holes (voids) in the porous base material moves at slow moving speed in a case where a nonaqueous electrolyte secondary battery is constituted by using a laminated body, which includes the porous base material, as a nonaqueous electrolyte secondary battery separator or as a member of the nonaqueous electrolyte secondary battery separator. This causes the separator to have increased resistance to ion permeation (i.e. decreased ion permeability) as a result of (i) the battery drying out due to a lack of electrolyte which is supplied to electrodes during battery charge and discharge and (ii) the generated gas remaining in the voids. Consequently, the cycle characteristic of the nonaqueous electrolyte secondary battery deteriorates.

The "diminution rate of diethyl carbonate dropped on the porous base material" herein refers to a speed at which the DEC that has been dropped on the porous base material evaporates, and is measured by the following method under the following measurement conditions.

Measurement conditions: atmospheric pressure; room temperature (approximately 25° C.); humidity of 60% to 70%; and air velocity of not more than 0.2 m/s;

Measurement Method:

(i) A square piece having sides of 50 mm×50 mm each is cut out from the porous base material, and is then placed on a polytetrafluoroethylene (PTFE) plate. Then, the PTFE plate, on which the porous base material is placed, is placed on an analytical balance, and then a zero point adjustment is carried out.

(ii) 20 mL of DEC is measured out with the use of a micropipette having a tip to which a pipette tip is attached.

(iii) 20 μL of the DEC measured out in the step (ii) is dropped (a) from a position which is 5 mm high above the porous base material placed on the analytical balance which has been subjected to zero point adjustment in the step (i) and (b) toward a center part of the porous base material, and then a scale of the analytical balance, that is, a weight of the DEC is measured.

(iv) A length of time it takes for the weight of the DEC measured in the step (iii) to decrease from 15 mg to 5 mg is measured, and then the length of time thus measured is divided by an amount (10 mg) by which the weight of the DEC has changed, so that the "diminution rate by which the diethyl carbonate dropped on the porous base material" (sec/mg) is calculated.

The porous base material in accordance with an embodiment of the present invention is arranged so that a spot diameter of diethyl carbonate 10 seconds after the diethyl carbonate was dropped on the porous base material is not less than 20 mm, preferably not less than 21 mm, and more preferably not less than 22 mm. In addition, the spot diameter is preferably not more than 30 mm.

If the spot diameter of the diethyl carbonate 10 seconds after the diethyl carbonate was dropped on the porous base material is less than 20 mm, then it means that the DEC thus dropped is absorbed into the voids inside the porous base material at a slow speed, and therefore the porous base material has low affinity with an electrolyte (such as DEC). Therefore, in a case where a nonaqueous electrolyte secondary battery is constituted by using a laminated body, which includes the porous base material, as a nonaqueous electrolyte secondary battery separator or as a member of the nonaqueous electrolyte secondary battery separator, there is a reduction in a moving speed of an electrolyte such as DEC in the porous base material, particularly a reduction in a speed at which the DEC is absorbed from an electrode mix layer into the inside of the porous base material during battery charge and discharge. Meanwhile, a decrease in permeation of the electrolyte into the inside of the porous base material causes the amount of liquid retained in the porous base material to decrease. This means that, in a case where battery charge and discharge is repeated, the electrolyte can easily be depleted locally (i) at an interface between the separator and the electrode and (ii) inside the porous base material. As a result, an internal resistance in the battery increases, and therefore the cycle characteristic of the nonaqueous electrolyte secondary battery deteriorates. Furthermore, if the spot diameter of the diethyl carbonate 10 seconds after the diethyl carbonate was dropped on the porous base material is more than 30 mm, then it means that, in a case where a nonaqueous electrolyte secondary battery is constituted by using a laminated body, which includes the porous base material, as a nonaqueous electrolyte secondary battery separator or as a member of the nonaqueous electrolyte secondary battery separator, an affinity between the porous base material and the electrolyte becomes excessively high, and that the electrolyte can be therefore retained in the porous base material excessively easily. As a result, the electrolyte may be insufficiently supplied to an electrode during battery charge and discharge, and therefore the battery can easily dry out. This may cause the discharge rate characteristic and the cycle characteristic of the nonaqueous electrolyte secondary battery to deteriorate.

The "spot diameter of the diethyl carbonate 10 seconds after the diethyl carbonate was dropped on the porous base material" herein means a diameter of a dropped mark of the DEC remaining on the porous base material after 10 seconds have passed since 20 μL of DEC was dropped on the porous base material, and is measured by the following method under the following measurement conditions.

Measurement conditions: atmospheric pressure; room temperature (approximately 25° C.); humidity of 60% to 70%; and air velocity of not more than 0.2 m/s;

Measurement method: Steps similar to the steps (i) through (iii) in the above method of measuring the "diminution rate by which the diethyl carbonate dropped on the porous base material" are carried out. Then, 20 μL of DEC is dropped (a) from a position which is 5 mm high above the porous base material and (b) toward a center part of the porous base material. Then, after 10 seconds pass, a diameter of a dropped mark of the DEC remaining on the porous base material is measured.

Note that in a case where, for example, there exists an adhering substance such as a resin powder and/or an inorganic matter on a surface of the porous base material during measurement of the diminution rate of diethyl carbonate and the spot diameter, it is possible, as necessary, to (i) immerse, before the measurement, the porous base material in an organic solvent such as DEC and/or water to clean and remove the adhering substance and the like and then (ii) carry out a pretreatment such as drying the solvent and the water.

The diminution rate of diethyl carbonate and the spot diameter can be controlled by, for example, setting a "T-die extrusion temperature" and a "heat fixation temperature after stretching" to respective certain ranges of temperatures in a porous base material production method described later.

A laminated body in accordance with an embodiment of the present invention includes, on the porous base material, a later-described porous layer containing a polyvinylidene fluoride-based resin. The laminated body may further include a publicly known porous layer(s) such as an adhesive layer, a heat-resistant layer, and a protective layer as another porous layer. In a case where the laminated body in accordance with an embodiment of the present invention is produced, that is, in a case where the later-described porous layer containing a polyvinylidene fluoride-based resin is disposed on the porous base material, the porous base material is more preferably subjected to a hydrophilization treatment before the porous layer is formed, that is, before the porous base material is coated with a coating solution (described later). Performing a hydrophilization treatment on the porous base material further improves coating easiness of the coating solution and thus allows a more uniform porous layer to be formed. The hydrophilization treatment is effective in a case where water accounts for a high proportion of a solvent (dispersion medium) contained in the coating solution. Specific examples of the hydrophilization treatment include publicly known treatments such as (i) a chemical treatment involving an acid, an alkali, or the like, (ii) a corona treatment, and (iii) a plasma treatment. Among these hydrophilization treatments, the corona treatment is more preferable because the corona treatment makes it possible to not only hydrophilize the porous base material within a relatively short period of time, but also hydrophilize only a surface and its vicinity of the porous base material to leave the inside of the porous base material unchanged in quality.

[Porous Layer]

The porous layer in accordance with an embodiment of the present invention contains a polyvinylidene fluoride-based resin, the polyvinylidene fluoride-based resin containing crystal form α in an amount of not less than 36 mol % with respect to 100 mol % of the total amount of the crystal form α and crystal form β contained in the polyvinylidene fluoride-based resin.

The amount of crystal form α is calculated from the absorption intensity at around 765 $cm^{-1}$ in the IR spectrum of the porous layer, while the amount of crystal form β is calculated from the absorption intensity at around 840 $cm^{-1}$ in the IR spectrum of the porous layer.

The porous layer in accordance with an embodiment of the present invention contains a polyvinylidene fluoride-based resin (PVDF-based resin). The porous layer contains a large number of pores connected to one another, and thus allows a gas or a liquid to pass therethrough from one surface to the other. Further, in a case where the porous layer in accordance with an embodiment of the present invention is used as a constituent member of a nonaqueous electrolyte secondary battery separator, the porous layer can be a layer capable of adhering to an electrode as the outermost layer of the separator.

Examples of the PVDF-based resin include homopolymers of vinylidene fluoride (that is, polyvinylidene fluoride); copolymers (for example, polyvinylidene fluoride copolymer) of vinylidene fluoride and other monomer(s) polymerizable with vinylidene fluoride; and mixtures of the above polymers. Examples of the monomer copolymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The PVDF-based resin can be synthesized through emulsion polymerization or suspension polymerization.

The PVDF-based resin contains vinylidene fluoride at a proportion of ordinarily not less than 85 mol %, preferably not less than 90 mol %, more preferably not less than 95 mol %, further preferably not less than 98 mol %. A PVDF-based resin containing vinylidene fluoride at a proportion of not less than 85 mol % is more likely to allow a porous layer to have a mechanical strength against pressure and a heat resistance against heat during battery production.

The porous layer can also preferably contain two kinds of PVDF-based resins (that is, a first resin and a second resin below) that differ from each other in terms of, for example, the hexafluoropropylene content.

The first resin is (i) a vinylidene fluoride-hexafluoropropylene copolymer containing hexafluoropropylene at a proportion of more than 0 mol % and not more than 1.5 mol % or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

A porous layer containing the two kinds of PVDF-based resins adheres better to an electrode than a porous layer not containing one of the two kinds of PVDF-based resins. Further, a porous layer containing the two kinds of PVDF-based resins adheres better to another layer (for example, the porous base material layer) included in a nonaqueous electrolyte secondary battery separator, with the result of a higher peel strength between the two layers, than a porous layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably 200,000 to 3,000,000. A PVDF-based resin having a weight-average molecular weight of not less than 200,000 tends to allow a porous layer to attain a mechanical property enough for the porous layer to endure a process of adhering the porous layer to an electrode, thereby allowing the porous layer and the electrode to adhere to each other sufficiently. A PVDF-based resin having a weight-average molecular weight of not more than 3,000,000 tends to not cause the coating solution, which is to be applied to form a porous layer, to have too high a viscosity, which allows the coating solution to have excellent shaping easiness. The weight-average molecular weight of the PVDF-based resin is more preferably 200,000 to 2,000,000, further preferably 500,000 to 1,500,000.

The PVDF-based resin has a fibril diameter of preferably 10 nm to 1000 nm in view of the cycle characteristic of a nonaqueous electrolyte secondary battery containing the porous layer.

The porous layer in accordance with an embodiment of the present invention may contain a resin other than the PVDF-based resin. Examples of the other resin include styrene-butadiene copolymers; homopolymers or copolymers of vinyl nitriles such as acrylonitrile and methacrylonitrile; and polyethers such as polyethylene oxide and polypropylene oxide.

The porous layer in accordance with an embodiment of the present invention may contain a filler. The filler may be an inorganic or organic filler. In a case where the porous layer in accordance with an embodiment of the present invention contains a filler, the filler is contained at a proportion of preferably not less than 1% by mass and not more than 99% by mass, more preferably not less than 10% by mass and not more than 98% by mass, with respect to the total amount of the polyvinylidene fluoride-based resin and the filler combined. Containing a filler allows a separator including the porous layer to have improved slidability and heat resistance, for example. The filler may be any inorganic or organic filler that is stable in a nonaqueous electrolyte and that is stable electrochemically. The filler preferably has a heat-resistant temperature of not lower than 150° C. to ensure safety of the battery.

Examples of the organic filler include: crosslinked polymethacrylic acid esters such as crosslinked polyacrylic acid, crosslinked polyacrylic acid ester, crosslinked polymethacrylic acid, and crosslinked polymethyl methacrylate; fine particles of crosslinked polymers such as crosslinked polysilicone, crosslinked polystyrene, crosslinked polydivinyl benzene, a crosslinked product of a styrene-divinylbenzene copolymer, polyimide, a melamine resin, a phenol resin, and a benzoguanamine-formaldehyde condensate; and fine particles of heat-resistant polymers such as polysulfone, polyacrylonitrile, polyaramid, polyacetal, and thermoplastic polyimide.

A resin (polymer) contained in the organic filler may be a mixture, a modified product, a derivative, a copolymer (a random copolymer, an alternating copolymer, a block copolymer, or a graft copolymer), or a crosslinked product of any of the molecular species listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia, and hydrates thereof; carbonates such as calcium carbonate and magnesium carbonate; sulfates such as barium sulfate and calcium sulfate; and clay minerals such as calcium silicate and talc. The inorganic filler is preferably a metal hydroxide, a hydrate of a metal oxide, or a carbonate to improve the safety of the battery, for example, to impart fire retardance. The inorganic filler is preferably a metal oxide in terms of insulation and oxidation resistance.

The present invention may use (i) only one filler or (ii) two or more kinds of fillers in combination. Alternatively, the organic filler(s) and the inorganic filler(s) may be used in combination.

The filler has a volume-average particle size of preferably 0.01 µm to 10 µm in order to ensure (i) fine adhesion and fine slidability and (ii) shaping easiness of the laminated body. The volume average particle size has a lower limit of more preferably not less than 0.05 µm, further preferably not less than 0.1 µm. The volume average particle size has an upper limit of more preferably not more than 5 µm, further preferably not more than 1 µm.

The filler may have any shape. The filler may, for example, be a particulate filler. Example shapes of the particles include a sphere, an ellipse, a plate shape, a bar shape, and an irregular shape. In order to prevent a short circuit in the battery, the particles are preferably (i) plate-shaped particles or (ii) primary particles that are not aggregated.

The filler forms fine bumps on a surface of the porous layer, thereby improving the slidability. A filler including (i) plate-shaped particles or (ii) primary particles that are not aggregated forms finer bumps on a surface of the porous layer so that the porous layer adheres better to an electrode.

The porous layer for in accordance with an embodiment of the present invention has an average thickness of preferably 0.5 µm to 10 µm, more preferably 1 µm to 5 µm, on one surface of the porous base material in order to ensure adhesion to an electrode and a high energy density.

If the porous layer has a thickness of less than 0.5 µm on one surface of the porous base material, it will be impossible to, in a case where the laminated body is used as a nonaqueous electrolyte secondary battery separator, sufficiently prevent an internal short circuit caused by, for example, breakage of the battery. Further, such a porous layer can retain only a smaller amount of electrolyte. If the porous layer has a thickness of more than 10 µm on one surface of the porous base material, the laminated body as a nonaqueous electrolyte secondary battery separator will have an increased resistance to permeation of lithium ions over the entire region of the separator. Thus, repeating charge-and-discharge cycles will degrade the cathode, with the result of a degraded discharge rate characteristic and a degraded cycle characteristic. Further, such a porous layer will increase the distance between the cathode and the anode, with the result of a larger nonaqueous electrolyte secondary battery.

In a case where the porous layer is disposed on both surfaces of the porous base material, the physical properties of the porous layer that are described below at least refer to the physical properties of the porous layer disposed on a surface of the porous base material which surface faces the cathode of the nonaqueous electrolyte secondary battery including the laminated body.

The porous layer only needs to have a weight per unit area (per surface of the porous layer) which weight is determined as appropriate in view of the strength, thickness, weight, and handleability of a laminated body. Note, however, that the porous base material ordinarily has a mass per unit area of preferably 0.5 $g/m^2$ to 20 $g/m^2$, more preferably 0.5 $g/m^2$ to 10 $g/m^2$, so as to allow a laminated body, which is used as a nonaqueous electrolyte secondary battery separator, to have a higher weight energy density and a higher volume energy density. If the weight per unit area of the porous layer is beyond the above range, the nonaqueous electrolyte secondary battery will be heavy in a case where the laminated body is used as a nonaqueous electrolyte secondary battery separator.

The porous layer contains a component(s) in a volume per square meter (per surface) within a range of preferably 0.5 cm³ to 20 cm³, more preferably 1 cm³ to 10 cm³, further preferably 2 cm³ to 7 cm³. In other words, the porous layer has a component volume per unit area (per surface) within a range of preferably 0.5 cm³/m² to 20 cm³/m², more preferably 1 cm³/m² to 10 cm³/m², further preferably 2 cm³/m² to 7 cm³/m². If the porous layer has a component volume per unit area of less than 0.5 cm³/m², it will be impossible to, in a case where the laminated body is used as a nonaqueous electrolyte secondary battery separator, sufficiently prevent an internal short circuit caused by, for example, breakage of the battery. If the porous layer has a component volume per unit area of more than 20 cm³/m², the laminated body as a nonaqueous electrolyte secondary battery separator will have an increased resistance to permeation of lithium ions over the entire region of the separator. Thus, repeating charge-and-discharge cycles will degrade the cathode, with the result of a degraded discharge rate characteristic and a degraded cycle characteristic.

The component volume per unit area of the porous layer is calculated by the following method:
(1) The weight per unit area of each component of the porous layer is calculated by multiplying the weight per unit area of the porous layer by the weight concentration of the component (that is, the weight concentration in the porous layer).
(2) The weight per unit area of the component calculated in (1) is divided by the absolute specific gravity of the component. Then, the sum total of numerical values calculated is designated as the component volume per unit area of the B layer.

The porous layer has a porosity of preferably 20% by volume to 90% by volume, more preferably 30% by volume to 80% by volume, in order to achieve sufficient ion permeability. A pore size of each of pores of the porous layer is preferably not more than 3 μm, more preferably not more than 1 μm, and still more preferably not more than 0.5 μm, so that the porous layer and a nonaqueous electrolyte secondary battery separator including the porous layer can have sufficient ion permeability.

The porous layer in accordance with an embodiment of the present invention has a surface roughness, in terms of a ten-point average roughness (Rz), of preferably 0.8 μm to 8.0 μm, more preferably 0.9 μm to 6.0 μm, and still more preferably 1.0 μm to 3.0 μm. The ten-point average roughness (Rz) is a value measured by a method in conformity with JIS B 0601-1994 (or Rzjis of JIS B 0601-2001). Specifically, Rz is a value measured with use of ET4000 (manufactured by Kosaka Laboratory Ltd.) with a measurement length of 1.25 mm, a measurement rate of 0.1 mm/sec, and a temperature and humidity of 25° C./50% RH.

The porous layer in accordance with an embodiment of the present invention has a coefficient of kinetic friction of preferably 0.1 to 0.6, more preferably 0.1 to 0.4, and still more preferably 0.1 to 0.3. The coefficient of kinetic friction is a value measured by a method in conformity with JIS K 7125. Specifically, a coefficient of kinetic friction in accordance with an embodiment of the present invention is a value measured by use of Surface Property Tester (manufactured by Heidon).

<Crystal Forms of PVDF-Based Resin>

The PVDF-based resin in the porous layer in accordance with an embodiment of the present invention contains crystal form α in an amount of not less than 36 mol %, preferably not less than 39 mol %, more preferably not less than 60 mol %, further preferably not less than 70 mol %, with respect to 100 mol % of the total amount of crystal form α and crystal form β contained. Further, the amount of crystal form α is preferably not more than 95 mol %. Containing crystal form α in an amount of not less than 36 mol % allows a laminated body including the porous layer to be used as a member of a nonaqueous electrolyte secondary battery such as a nonaqueous electrolyte secondary battery separator that is not easily curled.

A laminated body in accordance with an embodiment of the present invention can prevent itself from curling presumably because, for example, (i) a smaller content of the PVDF-based resin having crystal form β, which PVDF-based resin strongly adheres to the porous base material, allows the porous layer to be deformed to only a moderately smaller degree in response to deformation of the porous base material and/or (ii) a larger content of the PVDF-based resin having crystal form α, which PVDF-based resin is high in rigidity, allows the porous layer to be more resistant to deformation.

The PVDF-based resin having crystal form α is arranged such that the polymer of the PVDF-based resin contains a PVDF skeleton having molecular chains including a main-chain carbon atom bonded to a fluorine atom (or a hydrogen atom) adjacent to two carbon atoms one of which is bonded to a hydrogen atom (or a fluorine atom) having a trans position and the other (opposite) one of which is bonded to a hydrogen atom (or a fluorine atom) having a gauche position (positioned at an angle of 60°), wherein two or more such conformations are chained consecutively as follows:

$$(TG\overline{TG}\text{Structure})$$ [Math. 1]

and the molecular chains each have the following type:

$$TG\overline{TT}$$ [Math. 2]

wherein the respective dipole moments of C—F$_2$ and C—H$_2$ bonds each have a component perpendicular to the molecular chain and a component parallel to the molecular chain.

The PVDF-based resin having crystal form α has characteristic peaks (characteristic absorptions) at around 1,212 cm$^{-1}$, around 1,183 cm$^{-1}$, and around 765 cm$^{-1}$ in its IR spectrum. The PVDF-based resin having crystal form α has characteristic peaks at around 2θ=17.7°, around 2θ=18.3°, and around 2θ=19.9° in a powder X-ray diffraction analysis.

The PVDF-based resin having crystal form β is arranged such that the polymer of the PVDF-based resin contains a PVDF skeleton having molecular chains including a main-chain carbon atom adjacent to two carbon atoms bonded to a fluorine atom and a hydrogen atom, respectively, each having a trans conformation (TT-type conformation), that is, the fluorine atom and the hydrogen atom bonded respectively to the two carbon atoms are positioned oppositely at an angle of 180° to the direction of the carbon-carbon bond.

The PVDF-based resin having crystal form β may be arranged such that the polymer of the PVDF-based resin contains a PVDF skeleton that has a TT-type conformation in its entirety. The PVDF-based resin having crystal form β may alternatively be arranged such that a portion of the PVDF skeleton has a TT-type conformation and that the PVDF-based resin having crystal form β has a molecular chain of the TT-type conformation in at least four consecutive PVDF monomeric units. In either case, (i) the carbon-carbon bond, in which the TT-type conformation constitutes a TT-type main chain, has a planar zigzag structure, and (ii)

the respective dipole moments of C—F$_2$ and C—H$_2$ bonds each have a component perpendicular to the molecular chain.

The PVDF-based resin having crystal form β has characteristic peaks (characteristic absorptions) at around 1,274 cm$^{-1}$, around 1,163 cm$^{-1}$, and around 840 cm$^{-1}$ in its IR spectrum. The PVDF-based resin having crystal form β has a characteristic peak at around 2θ=21° in a powder X-ray diffraction analysis.

A PVDF-based resin having crystal form γ is arranged such that the polymer of the PVDF-based resin contains a PVDF skeleton that has a conformation in which TT-type conformations and TG-type conformations appear consecutively and alternately. The PVDF-based resin having crystal form γ has characteristic peaks (characteristic absorptions) at around 1,235 cm$^{-1}$ and around 811 cm$^{-1}$ in its IR spectrum. The PVDF-based resin having crystal form γ has a characteristic peak at around 2θ=18° in a powder X-ray diffraction analysis.

<Method of Calculating Content Rates of Crystal Form α and Crystal Form β in PVDF-Based Resin>

The respective content rates of crystal form α and crystal form β in the PVDF-based resin can be calculated by, for example, the methods (i) to (iii) below.

(i) Calculation formula $$\text{Law of Beer: } A = \varepsilon bC \quad (1)$$

where A represents an absorbance, ε represents a molar extinction coefficient, b represents an optical path length, and C represents a concentration.

Assuming that on the basis of the above formula (1), $A^\alpha$ represents the absorbance of the characteristic absorption of crystal form α, $A^\beta$ represents the absorbance of the characteristic absorption of crystal form β, $\varepsilon^\alpha$ represents the molar extinction coefficient of the PVDF-based resin having crystal form α, $\varepsilon^\beta$ represents the molar extinction coefficient of the PVDF-based resin having crystal form β, $C^\alpha$ represents the concentration of the PVDF-based resin having crystal form α, and $C^\beta$ represents the concentration of the PVDF-based resin having crystal form β, the respective proportions of the respective absorbances of crystal form α and crystal form β are expressed as follows:

$$A^\beta/A^\alpha = (\varepsilon^\beta/\varepsilon^\alpha) \times (C^\beta/C^\alpha) \quad (1a)$$

Assuming that a correction factor ($\varepsilon^\beta/\varepsilon^\alpha$) for the molar extinction coefficient is $E^{\beta/\alpha}$, the content rate $F(\beta)=(C^\beta/(C^\alpha+C^\beta))$ of the PVDF-based resin having crystal form β with respect to the crystal form α and crystal form β combined is expressed by the following formula (2a):

$$F(\beta) = \{(1/E^{\beta/\alpha}) \times (A^\alpha/A^\beta)\} / \{1 + (1/E^{\beta/\alpha}) \times (A^\alpha/A^\beta)\} = \quad (2a)$$

$$A^\beta / \{(E^{\beta/\alpha} \times A^\alpha) + A^\beta\}$$

Thus, in a case where the correction factor $E^{\beta/\alpha}$ is determined, the content rate F(β) of the PVDF-based resin having crystal form β with respect to the crystal form α and crystal form β combined can be calculated from an actual measurement of the absorbance $A^\alpha$ of the characteristic absorption of crystal form α and an actual measurement of the absorbance $A^\beta$ of the characteristic absorption of crystal form β. Further, the content rate F(α) of the PVDF-based resin having crystal form α with respect to the crystal form α and crystal form β combined can be calculated from F(β) calculated as above.

(ii) Method of Determining Correction Factor $E^{\beta/\alpha}$

A sample of a PVDF-based resin having only crystal form α is mixed with a sample of a PVDF-based resin having only crystal form β for preparation of a sample with a known content rate F(β) of the PVDF-based resin having crystal form β. The IR spectrum of the prepared sample is measured. Then, measurements are made of the absorbance (peak height) $A^\alpha$ of the characteristic absorption of crystal form α and the absorbance (peak height) $A^\beta$ of the characteristic absorption of crystal form β in the IR spectrum measured above.

Subsequently, $A^\alpha$, $A^\beta$, and F(β) are substituted into the formula (3a) below, into which the formula (2a) is solved for $E^{\beta/\alpha}$, to determine a correction factor $E^{\beta/\alpha}$.

$$E^{\beta/\alpha} = \{A^\beta \times (1-F(\beta))\} / (A^\alpha \times F(\beta)) \quad (3a)$$

Measurements are made of respective IR spectrums of a plurality of samples having respective mixing ratios different from each other. The respective correction factors $E^{\beta/\alpha}$ of the plurality of samples are determined by the above method, and the average of the correction factors $E^{\beta/\alpha}$ is then calculated.

(iii) Calculation of Respective Content Rates of Crystal Form α and Crystal Form β in Sample For each sample, the content rate F(α) of the PVDF-based resin having crystal form α with respect to the crystal form α and crystal form β combined is calculated on the basis of the average correction factor EP/a calculated in (ii) above and the result of measurement of the IR spectrum of the sample.

Specifically, the content rate F(α) is calculated as follows: A laminated body including the above porous layer is prepared by a preparation method described later. A portion of the laminated body is cut out for preparation of a measurement sample. Then, the infrared absorption spectrum of the measurement sample at wave numbers from 4000 cm$^{-1}$ to 400 cm$^{-1}$ (measurement range) is measured at room temperature (approximately 25° C.) with use of an FT-IR spectrometer (available from Bruker Optics K.K.; model: ALPHA Platinum-ATR) with a resolution of 4 cm$^{-1}$ and 512 times of scanning. The measurement sample cut out is preferably in the shape of an 80 mm×80 mm square. The size and shape of the measurement sample are, however, not limited to that; the measurement sample simply needs to be so sized as to allow its infrared absorption spectrum to be measured. Then, from the spectrum measured, the absorption intensity ($A^\alpha$) at 765 cm$^{-1}$ (characteristic absorption of crystal form α) and the absorption intensity ($A^\beta$) at 840 cm$^{-1}$ (characteristic absorption of crystal form β) are determined. The starting point and end point of a waveform formed with the wave number set as a peak are connected with a straight line, where the length between the straight line and the peak wave number (peak top) denote an absorption intensity. For crystal form α, a maximum possible absorption intensity within the wave number range of 775 cm$^{-1}$ to 745 cm$^{-1}$ is assumed to be the absorption intensity ($A^\alpha$) at 765 cm$^{-1}$. For crystal form β, a maximum possible absorption intensity within the wave number range of 850 cm$^{-1}$ to 815 cm$^{-1}$ is assumed to be the absorption intensity ($A^\beta$) at 840 cm$^{-1}$. Note that the content rate F(α)(%) of crystal form α herein is calculated on the assumption of the average correction factor $E^{\beta/\alpha}$ being 1.681 (with reference to Japanese Patent Application Publication, Tokukai, No. 2005-200623). The calculation uses the following formula (4a):

$$F(\alpha)(\%) = [1 - \{\text{absorption intensity } (A^\beta) \text{ at 840 cm}^{-1} / (\text{absorption intensity } (A^\alpha) \text{ at 765 cm}^{-1} \times \text{correction factor } (E^{\beta/\alpha})(1.681) + \text{absorption intensity } (A^\beta) \text{ at 840 cm}^{-1})\}] \times 100 \quad (4a)$$

[Method of Producing Porous Layer]

The porous layer in accordance with an embodiment of the present invention can be produced by, for example, a method similar to a method of producing a below-described laminated body and nonaqueous electrolyte secondary battery separator for the present invention.

[Laminated Body]

The laminated body in accordance with an embodiment of the present invention of the present invention includes the above-described porous base material and the above-described porous layer disposed on one surface or both surfaces of the porous base material.

The laminated body in accordance with an embodiment of the present invention has a thickness of preferably 5.5 μm to 45 μm, more preferably 6 μm to 25 μm.

The laminated body in accordance with an embodiment of the present invention has an air permeability of preferably 30 sec/100 mL to 1000 sec/100 mL, more preferably 50 sec/100 mL to 800 sec/100 mL in terms of Gurley values. A laminated body having such an air permeability achieves sufficient ion permeability in a case where the laminated body is used as a nonaqueous electrolyte secondary battery separator. An air permeability larger than the above range means that the laminated body has a high porosity and thus has a coarse laminated structure. This may result in the laminated body having a lower strength and thus having an insufficient shape stability at high temperatures in particular. An air permeability smaller than the above range may, on the other hand, prevent the laminated body from having sufficient ion permeability when used as a nonaqueous electrolyte secondary battery separator and thus degrade the battery characteristics of the nonaqueous electrolyte secondary battery.

A laminated body in accordance with an embodiment of the present invention may include, in addition to the above-described porous base material and porous layer, a publicly known porous film(s) such as a heat-resistant layer, an adhesive layer, and a protective layer according to need as long as such a porous film does not prevent an object of the present invention from being attained.

Embodiment 2: Nonaqueous Electrolyte Secondary Battery Member; Embodiment 3: Nonaqueous Electrolyte Secondary Battery A nonaqueous electrolyte secondary battery member in accordance with Embodiment 2 of the present invention includes a cathode, the laminated body in accordance with Embodiment 1 of the present invention, and an anode that are arranged in this order. A nonaqueous electrolyte secondary battery in accordance with Embodiment 3 of the present invention includes the laminated body in accordance with Embodiment 1 as a separator, and preferably includes the nonaqueous electrolyte secondary battery member in accordance with Embodiment 2 of the present invention. The nonaqueous electrolyte secondary battery in accordance with Embodiment 3 of the present invention further includes a nonaqueous electrolyte.

[Nonaqueous Electrolyte]

A nonaqueous electrolyte in accordance with an embodiment of the present invention is a nonaqueous electrolyte in general use for a nonaqueous electrolyte secondary battery, and is not limited to any particular one. Examples of the nonaqueous electrolyte include a nonaqueous electrolyte prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination. It is preferable to use, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte in accordance with an embodiment of the present invention include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvents described above. The present embodiment may use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is further preferable. The mixed solvent of a cyclic carbonate and an acyclic carbonate is further preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

[Cathode]

The cathode is ordinarily a sheet-shaped cathode including (i) a cathode mix containing a cathode active material, an electrically conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide may further contain any of various metallic elements, and is further preferably complex lithium nickelate.

Further, the complex lithium nickelate more preferably contains at least one metallic element selected from the group consisting of Ti, Zr, Ce, Y, V, Cr, Mn, Fe, Co, Cu, Ag, Mg, Al, Ga, In, and Sn at a proportion of 0.1 mol % to 20 mol % with respect to the sum of the number of moles of the at least one metallic element and the number of moles of Ni in the lithium nickelate. This is because such a complex lithium nickelate allows an excellent cycle characteristic for use in a high-capacity battery. Among others, an active material that contains Al or Mn and that contains Ni at a proportion of not less than 85%, further preferably not less than 90%, is particularly preferable because a nonaqueous electrolyte secondary battery including a cathode containing the above active material has an excellent in cycle characteristic for use as a high-capacity battery.

Examples of the electrically conductive material include carbonaceous materials such as natural graphite, artificial graphite, cokes, carbon black, pyrolytic carbons, carbon fiber, and a fired product of an organic polymer compound. The present embodiment may use (i) only one kind of the above electrically conductive materials or (ii) two or more kinds of the above electrically conductive materials in combination, for example a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluo or oethylene copolymer, a vinylidene fluoride-hexafluoropropylene-tetrafluoroethylene copolymer, a thermoplastic polyimide, polyethylene, and polypropylene; an acrylic resin; and styrene-butadiene rubber. The binding agent functions also as a thickening agent.

The cathode mix may be prepared by, for example, a method of applying pressure to the cathode active material, the electrically conductive material, and the binding agent on the cathode current collector or a method of using an appropriate organic solvent so that the cathode active material, the electrically conductive material, and the binding agent are in a paste form.

Examples of the cathode current collector include electric conductors such as Al, Ni, and stainless steel. Among these, Al is preferable as it is easy to process into a thin film and less expensive.

The sheet-shaped cathode may be produced, that is, the cathode mix may be supported by the cathode current collector, through, for example, a method of applying pressure to the cathode active material, the electrically conductive material, and the binding agent on the cathode current collector to form a cathode mix thereon or a method of (i) using an appropriate organic solvent so that the cathode active material, the electrically conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

[Anode]

The anode is ordinarily a sheet-shaped anode including (i) an anode mix containing an anode active material and (ii) an anode current collector supporting the anode mix thereon. The sheet-shaped anode preferably contains the above electrically conductive material and binding agent.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; chalcogen compounds such as an oxide and a sulfide that are doped and dedoped with lithium ions at an electric potential lower than that for the cathode; metals such as aluminum (Al), lead (Pb), tin (Sn), bismuth (Bi), or silicon (Si), each of which is alloyed with alkali metal; an intermetallic compound (AlSb, $Mg_2Si$, $NiSi_2$) of a cubic system in which intermetallic compound alkali metal can be inserted in voids in a lattice; and a lithium nitrogen compound ($Li_{3-x}M_xN$ (where M represents a transition metal)). Of the above anode active materials, a carbonaceous material that contains, as a main component, a graphite material such as natural graphite or artificial graphite is preferable. This is because such a carbonaceous material is high in potential evenness, and a great energy density can be obtained in a case where the carbonaceous material, which is low in average discharge potential, is combined with the cathode. The anode active material may alternatively be a mixture of graphite and silicon, preferably containing Si at a proportion of not less than 5%, more preferably not less than 10%, with respect to C in the graphite.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel. Among these, Cu is preferable as it is not easily alloyed with lithium in the case of a lithium-ion secondary battery in particular and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped anode mix is firmly fixed to the anode current collector. The above paste preferably includes the above electrically conductive material and binding agent.

A nonaqueous electrolyte secondary battery member in accordance with an embodiment of the present invention can be produced by, for example, a method of arranging the cathode, the above-described laminated body, and the anode in this order. A nonaqueous electrolyte secondary battery in accordance with an embodiment of the present invention can be produced by, for example, (i) forming a nonaqueous electrolyte secondary battery member by the method described above, (ii) placing the nonaqueous electrolyte secondary battery member in a container which is to serve as a housing of the nonaqueous electrolyte secondary battery, (iii) filling the container with a nonaqueous electrolyte, and then (iv) hermetically sealing the container under reduced pressure. The nonaqueous electrolyte secondary battery may have any shape such as the shape of a thin plate (sheet), a disk, a cylinder, or a prism such as a cuboid. The nonaqueous electrolyte secondary battery member and the nonaqueous electrolyte secondary battery may each be produced through any method, and may each be produced through a conventionally publicly known method.

The nonaqueous electrolyte secondary battery member in accordance with an embodiment of the present invention and the nonaqueous electrolyte secondary battery in accordance with an embodiment of the present invention each include a porous base material arranged so that the above described "diminution rate by which the diethyl carbonate dropped on the porous base material" and "spot diameter of the diethyl carbonate 10 seconds after the diethyl carbonate was dropped on the porous base material" fall within respective certain ranges, that is, a porous base material arranged so that in a nonaqueous electrolyte secondary battery, the following properties are each controlled to be in a fixed range: (i) a property to retain a nonaqueous electrolyte and (ii) a moving speed of a fluid in voids of the separator. Therefore, a nonaqueous electrolyte secondary battery including the nonaqueous electrolyte secondary battery member in accordance with an embodiment of the present invention and the nonaqueous electrolyte secondary battery in accordance with an embodiment of the present invention each have an excellent discharge rate characteristic and an excellent cycle characteristic. A nonaqueous electrolyte secondary battery member in accordance with an embodiment of the present invention and a nonaqueous electrolyte secondary battery of the present invention each include the above-described porous layer, which contains a polyvinylidene fluoride-based resin (PVDF-based resin), the PVDF-based resin containing crystal form α in an amount of not less than 36 mol % with respect to 100 mol % of the total amount of the crystal form α and crystal form β contained. The nonaqueous electrolyte secondary battery member in accordance with an embodiment of the present invention and the nonaqueous electrolyte secondary battery in accordance with an embodiment of the present invention are not easily curled as a result.

[Method of Producing Laminated Body in Accordance with an Embodiment of the Present Invention]

A method of producing a laminated body in accordance with an embodiment of the present invention can include (i) a method below for producing a porous base material in accordance with an embodiment of the present invention and (ii) a method below for producing a porous layer in accordance with an embodiment of the present invention.

[Method of Producing Porous Base Material]

A method of producing a porous base material in accordance with an embodiment of the present invention can be, for example, a method in which a further step as a suitable step that can be included in a method generally carried out for producing a porous base material (porous film) is combined with the following steps (i) and (ii): (i) the step of extruding a polyolefin resin composition, in a sheet-like shape, from a T-die at a certain T-die extrusion temperature; and (ii) the step of carrying out heat fixation at a certain heat fixation temperature, so as to obtain a porous base material containing a polyolefin-based resin as a main component. Examples of the suitable step include a step of adding a plasticizer to a resin such as polyolefin so as to form a film and then removing the plasticizer with the use of a suitable solvent, so that a porous base material is formed.

Specifically, in a case where, for example, a porous base material is to be produced with the use of a polyolefin resin containing ultra-high molecular weight polyethylene and low molecular weight polyolefin which has a weight-average molecular weight of not more than 10,000, the porous base material is preferably produced by, in view of production costs, the method:

A method of obtaining a porous base material, including the steps of:
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of a pore forming agent, so that a polyolefin resin composition is obtained;

(2) forming, into a sheet, the polyolefin resin composition with the use of a T-die at a certain T-die extrusion temperature;
(3) removing the pore forming agent from the sheet thus obtained in the step (2);
(4) stretching the sheet from which the pore forming agent has been removed in the step (3); and
(5) subjecting the sheet, which has been thus stretched in the step (4), to heat fixation at a certain heat fixation temperature.

Alternatively, a method of obtaining a porous base material, including the steps of:
(1) kneading 100 parts by weight of ultra-high molecular weight polyethylene, 5 parts by weight to 200 parts by weight of low molecular weight polyolefin having a weight-average molecular weight of not more than 10,000, and 100 parts by weight to 400 parts by weight of a pore forming agent, so that a polyolefin resin composition is obtained;
(2) forming, into a sheet, the polyolefin resin composition with the use of a T-die at certain a T-die extrusion temperature;
(3') stretching the sheet thus obtained in the step (2);
(4') removing the pore forming agent from the sheet thus stretched in the step (3'); and
(5') subjecting the sheet, which has been thus obtained in the step (4'), to heat fixation at a certain heat fixation temperature.

Examples of the pore forming agent include an inorganic filler and a plasticizer.

Examples of the inorganic filler include, but are not particularly limited to, (i) an inorganic filler that can be dissolved in a water-based solvent containing an acid, (ii) an inorganic filler that can be dissolved in a water-based solvent containing an alkali, and (iii) an inorganic filler that can be dissolved in a water-based solvent constituted mainly by water. Examples of the inorganic filler that can be dissolved in a water-based solvent containing an acid include calcium carbonate, magnesium carbonate, barium carbonate, zinc oxide, calcium oxide, aluminum hydroxide, magnesium hydroxide, calcium hydroxide, and calcium sulfate. Among these, calcium carbonate is preferable because an inexpensive, fine powder of calcium carbonate can be obtained easily. Examples of the inorganic filler that can be dissolved in a water-based solvent containing an alkali include silicic acid and zinc oxide. Among these, silicic acid is preferable because an inexpensive, fine powder of silicic acid can be obtained easily. Examples of the inorganic filler that can be dissolved in a water-based solvent constituted mainly by water include calcium chloride, sodium chloride, and magnesium sulfate.

Examples of the plasticizer include, but are not particularly limited to, a low molecular weight hydrocarbon such as liquid paraffin.

The T-die extrusion temperature in the step (2) is a temperature of the T-die when the polyolefin resin composition is extruded in a sheet-like shape, and is preferably 245° C. to 280° C., and more preferably 245° C. to 260° C.

This is because, in a case where the T-die extrusion temperature falls within these ranges, a resin to constitute the sheet to be obtained is oxidized to an appropriate extent, and is therefore increased in affinity with an electrolyte solution. More specifically, in a case where the T-die extrusion temperature is increased, such as not less than 245° C., it is possible to increase acidity of a resin by which the sheet is constituted, and therefore to increase the affinity of the resin with an electrolyte. This allows an increase in electrolyte retention property of a porous base material to be obtained. Meanwhile, in a case where the T-die extrusion temperature is decreased, such as not more than 280° C., it is possible to restrict an increase in acidity of a resin by which the sheet is constituted, and therefore to decrease the affinity of the resin with an electrolyte. This allows restriction of an excessive increase in electrolyte retention property of a porous base material to be obtained. Therefore, in a case where the T-die extrusion temperature is adjusted in a proper range, it is possible to properly adjust affinity between the resin and an electrolyte. This allows an increase, to a suitable extent, in electrolyte retention property of a porous base material to be obtained.

The heat fixation temperature in each of the steps (5) and (5') is preferably 100° C. to 125° C., and more preferably 100° C. to 120° C.

This is because, in a case where the heat fixation temperature falls within these ranges, a porous base material to be obtained will have, inside thereof, holes (voids) whose pore size and channel (tortuosity) are controlled, so that a speed at which the electrolyte inside the porous base material evaporates (speed at which the electrolyte moves) can be controlled. More specifically, in a case where the heat fixation temperature is increased, such as not less than 100° C., it is possible to (i) enlarge a pore size of holes in the porous base material and (ii) shorten channels. This allows an increase in speed at which the electrolyte evaporates in the porous base material (speed at which the electrolyte moves), that is, it is possible to restrict an excessive increase in electrolyte retention property of a porous base material to be obtained. Meanwhile, in a case where the heat fixation temperature is decreased, such as not more than 125° C., it is possible to (i) reduce a pore size of holes in the porous base material and (ii) extend channels. This allows a reduction in speed at which the electrolyte evaporates in the porous base material (speed at which the electrolyte moves), that is, it is possible to increase an electrolyte retention property of a porous base material to be obtained. Therefore, in a case where the heat fixation temperature is adjusted in a proper range, it is possible to properly adjust affinity between the resin and an electrolyte. This makes it possible to restrict, to specified ranges, (i) a liquid retention property of a porous base material to be obtained and (ii) a speed at which a fluid moves in the voids.

In a case where the T-die extrusion temperature and the heat fixation temperature fall within the above respective ranges, the porous base material to be produced will be arranged so that (i) an electrolyte retention property is controlled to be in a preferable range and (ii) a fluid moving speed in the voids inside the porous base material is controlled to be in a preferable range. This allows for production of a porous base material which is arranged so that (i) a diminution rate of diethyl carbonate dropped on the porous base material is 15 sec/mg to 21 sec/mg and (ii) a spot diameter of the diethyl carbonate 10 seconds after the diethyl carbonate was dropped on the porous base material is not less than 20 mm.

[Method of Producing Porous Layer and Method of Producing Laminated Body]

A porous layer and laminated body in accordance with an embodiment of the present invention may each be produced by any production method, and may each be produced by any of various methods.

In an example method, a porous layer containing a PVDF-based resin and optionally a filler is formed, through one of the processes (1) to (3) below, on a surface of a polyolefin-based resin microporous film to be a porous base material. In the case of the process (2) or (3), a porous layer deposited is dried for removal of the solvent. In the processes (1) to (3), the coating solution, in the case of production of a porous layer containing a filler, preferably contains a filler dispersed therein and a PVDF-based resin dissolved therein.

The coating solution for use in a method of producing a porous layer in accordance with an embodiment of the present invention can be prepared ordinarily by (i) dissolving, in a solvent, a resin to be contained in the porous layer for the present embodiment and (ii) dispersing, in the solvent, fine particles to be contained in the porous layer in accordance with an embodiment of the present invention.

(1) A process of (i) coating a surface of a porous base material with a coating solution containing fine particles of a PVDF-based resin to be contained in a porous layer and optionally fine particles of a filler and (ii) drying the surface of the porous base material to remove the solvent (dispersion medium) from the coating solution for formation of a porous layer.

(2) A process of (i) coating a surface of a porous base material with a coating solution containing fine particles of a PVDF-based resin to be contained in a porous layer and optionally fine particles of a filler and then (ii) immersing the porous base material into a deposition solvent (which is a poor solvent for the PVDF-based resin) for deposition of a porous layer containing the PVDF-based resin and optionally the filler.

(3) A process of (i) coating a surface of a porous base material with a coating solution containing fine particles of a PVDF-based resin to be contained in a porous layer and optionally fine particles of a filler and then (ii) making the coating solution acidic with use of a low-boiling-point organic acid for deposition of a porous layer containing the PVDF-based resin and optionally the filler.

The solvent (dispersion medium) in the coating solution may be any solvent that does not adversely affect the porous base material, that allows a PVDF-based resin to be dissolved or dispersed therein uniformly and stably, and that allows a filler to be dispersed therein uniformly and stably. Examples of the solvent (dispersion medium) include N-methylpyrrolidone, N,N-dimethylacetamide, N,N-dimethylformamide, acetone, and water.

The deposition solvent can be, for example, another solvent (hereinafter also referred to as "solvent X") that is dissolvable in the solvent (dispersion medium) contained in the coating solution and that does not dissolve the PVDF-based resin contained in the coating solution. The solvent (dispersion medium) can be efficiently removed from the coating solution by (i) immersing, in the solvent X, a porous base material to which the coating solution has been applied and on which a coating film has been formed, for replacement of the solvent (dispersion medium) in the coating film on the porous base material or a support with the solvent X and then (ii) evaporating the solvent X. The deposition solvent is preferably isopropyl alcohol or t-butyl alcohol, for example.

For the process (3), the low-boiling-point organic acid can be, for example, paratoluene sulfonic acid or acetic acid.

The coating solution may be prepared by any method that allows the coating solution to satisfy conditions such as the resin solid content (resin concentration) and the fine-particle amount that are necessary to produce a desired porous layer. Specific examples of the method of preparing a coating solution include a mechanical stirring method, an ultrasonic dispersion method, a high-pressure dispersion method, and a media dispersion method. The fine particles may be dispersed in the solvent (dispersion medium) with use of a conventionally publicly known dispersing device such as a three-one motor, a homogenizer, a medium-type dispersing device, or a pressure-type dispersing device. Further, the coating solution may be prepared simultaneously with wet grinding of fine particles by supplying into a wet grinding device a liquid in which a resin is dissolved or swollen or an emulsified liquid of a resin during wet grinding carried out to produce fine particles having a desired average particle diameter. In other words, the wet grinding of fine particles and the preparation of a coating solution may be carried out simultaneously in a single step. The coating solution may contain an additive(s) such as a dispersing agent, a plasticizer, a surfactant, and a pH adjusting agent as a component(s) other than the resin and the fine particles as long as such an additive does not prevent an object of the present invention from being attained. The additive may be added in an amount that does not prevent an object of the present invention from being attained.

The coating solution may be applied to the porous base material by any method, that is, a porous layer may be formed by any method on a surface of a porous base material that may have been subjected to a hydrophilization treatment as necessary. In a case where a porous layer is disposed on each of both surfaces of the porous base material, (i) a sequential deposition method may be used, in which a porous layer is formed on one surface of the porous base material, and another porous layer is subsequently formed on the other surface of the porous base material, or (ii) a simultaneous deposition method may be used, in which porous layers are formed simultaneously on both surfaces of the porous base material. A porous layer can be formed (that is, a laminated body can be produced) by, for example, (i) a method of applying the coating solution directly to a surface of the porous base material and then removing the solvent (dispersion medium), (ii) a method of applying the coating solution to an appropriate support, removing the solvent (dispersion medium) for formation of a porous layer, then pressure-bonding the porous layer to the porous base material, and peeling the support off, (iii) a method of applying the coating solution to a surface of an appropriate support, then pressure-bonding the porous base material to that surface, then peeling the support off, and then removing the solvent (dispersion medium), or (iv) a method of immersing the porous base material into the coating solution for dip coating and then removing the solvent (dispersion medium). The thickness of the porous layer can be controlled by adjusting, for example, the thickness of the coating film in a wet state (wet) after the coating, the weight ratio between the resin and the fine particles, and the solid content concentration (that is, the sum of the resin concentration and the fine-particle concentration) of the coating solution. The support can be, for example, a resin film, a metal belt, or a drum.

The coating solution may be applied to the porous base material or support by any method that can achieve a necessary weight per unit area and a necessary coating area. The coating solution can be applied by a conventionally publicly known method. Specific examples include a gravure coater method, a small-diameter gravure coater method, a reverse roll coater method, a transfer roll coater method, a kiss coater method, a dip coater method, a knife coater method, an air doctor blade coater method, a blade coater method, a rod coater method, a squeeze coater method, a cast coater method, a bar coater method, a die coater method, a screen printing method, and a spray coating method.

The solvent (dispersion medium) is typically removed by a drying method. Examples of the drying method include natural drying, air-blow drying, heat drying, and drying under reduced pressure. The solvent (dispersion medium) can, however, be removed by any method that allows the solvent (dispersion medium) to be removed sufficiently. The solvent (dispersion medium) contained in the coating solution may be replaced with another solvent before a drying operation. The solvent (dispersion medium) can be replaced with another solvent for removal by, for example, a method of (i) preparing another solvent (hereinafter referred to as "solvent X") that dissolves the solvent (dispersion medium) contained in the coating solution and that does not dissolve the resin contained in the coating solution, (ii) immersing the porous base material or support, to which the coating solution has been applied and on which a coating film has been formed, into the solvent X to replace the solvent (disperse medium) in the coating film on the porous base material or support with the solvent X, and (iii) evaporating the solvent X. This method allows the solvent (dispersion medium) to be removed efficiently from the coating solution. In a case where the coating film, formed on the porous base material or support by applying the coating solution thereto, is heated when removing the solvent (dispersion medium) or solvent X from the coating film, the coating film is desirably heated at a temperature that does not decrease the air permeability of the porous base material, specifically within a range of 10° C. to 120° C., preferably within a range of 20° C. to 80° C., to prevent pores in the porous base material from contracting to decrease the air permeability of the porous base material.

The solvent (dispersion medium) is preferably removed by, in particular, a method of applying the coating solution to a base material and then drying the base material for formation of a porous layer. This arrangement makes it possible to produce a porous layer having a smaller porosity variation and fewer wrinkles.

The above drying can be carried out with the use of an ordinary drying device.

The porous layer ordinarily has, on one surface of the porous base material, an applied amount (weight per unit area) within a range of preferably 0.5 g/m² to 20 g/m², more preferably 0.5 g/m² to 10 g/m², further preferably 0.5 g/m² to 1.5 g/m², in terms of the solid content in view of adhesiveness to an electrode and ion permeability. This means that the amount of the coating solution to be applied to the porous base material is preferably adjusted so that the porous layer in a laminated body or nonaqueous electrolyte secondary battery separator to be produced has an applied amount (weight per unit area) within the above range.

In a case where an additional layer such as a heat-resistant layer is to be disposed on the laminated body, such a heat-resistant layer can be disposed by a method similar to the above method except that the resin for the porous layer is replaced with a resin for the heat-resistant layer.

The present embodiment is arranged such that in any of the processes (1) to (3), changing the amount of resin for a porous layer which resin is to be dissolved or dispersed in a solution can adjust the volume of resin that is contained per square meter of a porous layer having undergone immersion in an electrolyte solution and that has absorbed the electrolyte solution.

Further, changing the amount of solvent in which the resin for the porous layer is to be dissolved or dispersed can adjust the porosity and average pore diameter of a porous layer having undergone immersion in an electrolyte solution.

<Method of Controlling Crystal Forms of PVDF-Based Resin>

A laminated body in accordance with an embodiment of the present invention is produced while adjustment is made of the drying conditions (for example, the drying temperature, and the air velocity and direction during drying) and/or the deposition temperature (that is, the temperature at which a porous layer containing a PVDF-based resin is deposited with use of a deposition solvent or a low-boiling-point organic acid) for the above-described method to control the crystal forms of the PVDF-based resin to be contained in a porous layer to be formed. Specifically, a laminated body in accordance with an embodiment of the present invention can be produced while the drying conditions and the deposition temperature are adjusted so that the PVDF-based resin contains crystal form α in an amount of not less than 36 mol % (preferably not less than 39 mol %, more preferably not less than 60 mol %, further preferably not less than 70 mol %; preferably not more than 95 mol %) with respect to 100 mol % of the total amount of the crystal form α and crystal form β contained.

The drying conditions and the deposition temperature, which are adjusted so that the PVDF-based resin contains crystal form α in an amount of not less than 36 mol % with respect to 100 mol % of the total amount of the crystal form α and crystal form β contained, may be changed as appropriate by changing, for example, the method of producing a porous layer, the kind of solvent (dispersion medium) to be used, the kind of deposition solvent to be used, and/or the kind of low-boiling-point organic acid to be used.

In a case where a deposition solvent is not used and the coating solution is simply dried as in the process (1), the drying conditions may be changed as appropriate by adjusting, for example, the amount of the solvent in the coating solution, the concentration of the PVDF-based resin in the coating solution, the amount of the filler (if contained), and/or the amount of the coating solution to be applied. In a case where a porous layer is to be formed through the process (1) described above, it is preferable that the drying temperature be 30° C. to 100° C., that the direction of hot air for drying be perpendicular to a porous base material or electrode sheet to which the coating solution has been applied, and that the velocity of the hot air be 0.1 m/s to 40 m/s. Specifically, in a case where a coating solution to be applied contains N-methyl-2-pyrrolidone as the solvent for dissolving a PVDF-based resin, 1.0% by mass of a PVDF-based resin, and 9.0% by mass of alumina as an inorganic filler, the drying conditions are preferably adjusted so that the drying temperature is 40° C. to 100° C., that the direction of hot air for drying is perpendicular to a porous base material or electrode sheet to which the coating solution has been applied, and that the velocity of the hot air is 0.4 m/s to 40 m/s.

In a case where a porous layer is to be formed through the process (2) described above, it is preferable that the deposition temperature be −25° C. to 60° C. and that the drying temperature be 20° C. to 100° C. Specifically, in a case where a porous layer is to be formed through the above-described process (2) with use of N-methylpyrrolidone as the solvent for dissolving a PVDF-based resin and isopropyl alcohol as the deposition solvent, it is preferable that the deposition temperature be −10° C. to 40° C. and that the drying temperature be 30° C. to 80° C.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

EXAMPLES

The following description will discuss the present invention in greater detail with reference to Examples and Comparative Example. Note, however, that the present invention is not limited to the Examples and Comparative Example below.

[Method of Measuring Various Physical Properties, Etc. Of Porous Base Material]

In each of Production Examples 1 through 3 and Comparative Examples 1 and 2, physical properties such as "diminution rate of diethyl carbonate dropped on the porous base material", "spot diameter of diethyl carbonate 10 seconds after the diethyl carbonate was dropped on the porous base material", and "cycle characteristic" were measured by the following method.

(Diminution Rate of Diethyl Carbonate Dropped on Porous Base Material)

By the following method, the "diminution rate of diethyl carbonate dropped on the porous base material" (hereinafter also referred to as "diminution rate") of each of the nonaqueous electrolyte secondary battery separators produced in Production Examples 1 through 3 and Comparative Examples 1 and 2.

A square piece, which had sides of 50 mm×50 mm and which was to be measured, was cut out from each of the nonaqueous electrolyte secondary battery separators produced in Production Examples 1 through 3 and Comparative Examples 1 and 2, and was then placed on a polytetrafluoroethylene (PTFE) plate under conditions of (i) atmospheric pressure, (ii) room temperature (approximately 25° C.), (iii) a humidity of 60% to 70%, and (iv) an air velocity of not more than 0.2 m/s. Then, the polytetrafluoroethylene (PTFE) plate on which the square piece had been placed was placed on an analytical balance (manufactured by Shimadzu Corporation, model: AUW220), and was subjected to zero point adjustment. Then, diethyl carbonate (DEC) was measured out with the use of a micropipette (manufactured by Eppendorf, model: Reference, designed for 20 μL) having a tip to which a pipette tip (manufactured by Eppendorf, product name: Standard, yellow tip designed for 0.5 to 20 μL) was attached. After zero point adjustment was carried out, 20 μL of the DEC thus measured out was dropped from a position 5 mm high on a center part of the nonaqueous electrolyte secondary battery separator, and then an amount by which the weight changed was measured. Specifically, a length of time it took for the weight of the DEC to decrease from 15 mg to 5 mg (hereinafter referred to also as "evaporation time") was measured. Then, the "evaporation time" thus measured was divided by the amount (10 mg) by which the weight of the DEC has changed, so as to obtain a value, which was then designated as a measured value of the "diminution rate".

(Spot Diameter of Diethyl Carbonate 10 Seconds after Diethyl Carbonate was Dropped on Porous Base Material)

The "spot diameter of diethyl carbonate 10 seconds after the diethyl carbonate was dropped on the porous base material (hereinafter referred to also as "spot diameter")" of each of the nonaqueous electrolyte secondary battery separators produced in Production Examples 1 through 3 and Comparative Examples 1 and 2 was measured by the following method.

Under measurement conditions and by a measurement method similar to those for the measurement of the "diminution rate", 20 μL of DEC, which had been measured out, was dropped from a position 5 mm high on center part of the nonaqueous electrolyte secondary battery separator produced in each of Production Examples 1 through 3 and Comparative Examples 1 and 2. After 10 seconds passed, a diameter of a dropped mark of the DEC remaining on the nonaqueous electrolyte secondary battery separator was measured. Then, a measured value was designated as a measured value of the "spot diameter".

The "diminution rate" and the "spot diameter" of each of the nonaqueous electrolyte secondary battery separators produced in Production Examples 1 through 3 and Comparative Examples 1 and 2 were measured three times. Three measured values of the "diminution rate" were averaged so as to calculate the ultimate "diminution rate". Three measured values of the "spot diameter" were averaged so as to calculate the ultimate "spot diameter".

(Cycle Characteristic)

New nonaqueous electrolyte secondary batteries which were produced in Production Examples 1 through 3 and Comparative Examples 1 and 2 and which had not been subjected to a charge and discharge cycle were each subjected to four cycles of initial charge and discharge. Each of the four cycles of the initial charge and discharge was carried out at 25° C., at a voltage ranging from 4.1 V to 2.7 V, and at an electric current value of 0.2 C. Note that 1 C is defined as a value of an electric current at which a rated capacity based on a discharge capacity at 1 hour rate is discharged for 1 hour. The same applies to the following description.

Subsequently, an initial battery characteristic maintenance rate at 55° C. was calculated according to the following Formula (1).

Initial battery characteristic maintenance rate (%)= (discharge capacity at 20 C/discharge capacity at 0.2 C)×100    (1)

Subsequently, the nonaqueous electrolyte secondary battery was subjected to 100 cycles of charge and discharge, with each cycle being carried out at a temperature of 55° C., a constant charge electric current value of 1 C, and a constant discharge electric current value of 10 C. Subsequently, an battery characteristic maintenance rate after 100 cycles was calculated according to the following Formula (2).

Battery characteristic maintenance rate (%)=(discharge capacity at 20 C at 100th cycle/discharge capacity at 0.2 C at 100th cycle)×100    (2)

Production Example 1

<Production of Nonaqueous Electrolyte Secondary Battery Separator>

Ultra-high molecular weight polyethylene powder (GUR4032, manufactured by Ticona Corporation, weight-average molecular weight: 4970,000) and polyethylene wax (FNP-0115, manufactured by Nippon Seiro Co., Ltd.) having a weight-average molecular weight of 1000 were mixed at a ratio of 71.5% by weight:28.5% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average particle size of 0.1 μm was further added so as to account for 37% by volume of a total volume of the resultant mixture. Then, the resultant mixture while remaining a powder was mixed with the use of a Henschel mixer, so that a mixture 1 was obtained. Then, the mixture 1 was melted and kneaded with the use of a twin screw kneading extruder, so that a polyolefin resin composition 1 was obtained. Then, the polyolefin resin composition 1 was extruded in a sheet-like shape from a T-die which was set to 250° C. so as to obtain a sheet, and then the sheet was rolled with the use of a pair of rolls each having a surface temperature of 150° C., so that a rolled sheet 1 was prepared. Then, the rolled sheet 1 was immersed in a hydrochloric acid aqueous solution (containing 4 mol/L of hydrochloric acid and 0.5% by weight of a nonionic surfactant) so as to remove the calcium carbonate from the rolled sheet 1. Then, the resultant sheet was stretched with a stretch ratio of 7.0 times. Furthermore, the resultant sheet was subjected to heat fixation at 123° C. so that a porous base material 1 was obtained. The porous base material 1 thus obtained was designated as a nonaqueous electrolyte secondary battery separator 1.

<Preparation of Nonaqueous Electrolyte Secondary Battery>

(Preparation of Cathode)

A commercially available cathode was used that was produced by applying $LiNi_{0.5}Mn_{0.3}Co_{0.2}O_2$/electrically conductive material/PVDF (weight ratio 92:5:3) to an aluminum foil. The aluminum foil was partially cut off so that a cathode active material layer was present in an area of 40 mm×35 mm and that area was surrounded by an area with a width of 13 mm in which area no cathode active material layer was present. The cutoff was used as a cathode. The cathode active material layer had a thickness of 58 μm and a density of 2.50 g/cm³.

(Preparation of Anode)

A commercially available anode was used that was produced by applying graphite/styrene-1,3-butadiene copolymer/sodium carboxymethyl cellulose (weight ratio 98:1:1) to a copper foil. The copper foil was partially cut off so that an anode active material layer was present in an area of 50 mm×40 mm and that area was surrounded by an area with a width of 13 mm in which area no anode active material layer was present. The cutoff was used as an anode. The anode active material layer had a thickness of 49 μm and a density of 1.40 g/cm³.

(Production of Nonaqueous Electrolyte Secondary Battery)

In a laminate pouch, the cathode, the porous base material 1 (electrolyte secondary battery separator 1), and the anode were laminated (disposed) in this order so as to obtain a nonaqueous electrolyte secondary battery member 1. During this operation, the cathode and the anode were arranged so that the cathode active material layer of the cathode had a main surface that was entirely covered by the main surface of the anode active material layer of the anode.

Subsequently, the nonaqueous electrolyte secondary battery member 1 was put into a bag which had been made in advance of a laminate of an aluminum layer and a heat seal layer. Further, 0.25 mL of nonaqueous electrolyte was put into the bag. The above nonaqueous electrolyte was prepared by dissolving $LiPF_6$ in a mixed solvent of ethylene carbonate, ethyl methyl carbonate, and diethyl carbonate at a ratio of 3:5:2 (volume ratio) so that the $LiPF_6$ would be contained at 1 mol/L. The bag was then heat-sealed while the pressure inside the bag was reduced. This produced a nonaqueous electrolyte secondary battery 1.

Production Example 2

A porous base material 2 was obtained as in Production Example 1 except that (i) the amount of ultra-high molecular weight polyethylene powder (GUR4032, manufactured by Ticona Corporation) was set to 70% by weight, (ii) the amount of polyethylene wax (FNP-0115, manufactured by Nippon Seiro Co., Ltd.) having a weight-average molecular weight of 1000 was set to 30% by weight, (iii) calcium carbonate (manufactured by Maruo Calcium Co., Ltd.) having an average particle size of 0.1 μm was added so as to account for 36% by volume of a total volume of the resultant mixture, (iv) the stretch magnification was set to 6.2 times, and (v) the heat fixation temperature was set to 120° C. The porous base material 2 thus obtained was designated as a nonaqueous electrolyte secondary battery separator 2.

A nonaqueous electrolyte secondary battery 2 was prepared by a method similar to the method used in Production Example 1 except that the porous base material 1 was replaced with the porous base material 2.

Production Example 3

A porous base material 3 was obtained was in Production Example 2 except that the heat fixation temperature was changed to 110° C. The porous base material 3 was to be used as a nonaqueous electrolyte secondary battery separator 3.

A nonaqueous electrolyte secondary battery 3 was prepared by a method similar to the method used in Production Example 1 except that the porous base material 1 was replaced with the porous base material 3.

Comparative Example 1

Ultra-high molecular weight polyethylene powder (GUR2024, manufactured by Ticona Corporation, weight-average molecular weight: 4,970,000) and polyethylene wax (FNP-0115, manufactured by Nippon Seiro Co., Ltd.) having a weight-average molecular weight of 1000 were mixed at a ratio of 68% by weight:32% by weight. Then, to 100 parts by weight of a mixture of the ultra-high molecular weight polyethylene and the polyethylene wax, the following were added: 0.4 parts by weight of antioxidant (Irg1010, manufactured by Ciba Specialty Chemicals Inc.), 0.1 parts by weight of antioxidant (P168, manufactured by Ciba Specialty Chemicals Inc.), and 1.3 parts by weight of sodium stearate. Then, calcium carbonate (manufactured by Maruo Calcium Co., Ltd.) having an average particle size of 0.1 μm was further added so as to account for 38% by volume of a total volume of the resultant mixture. Then, the resultant mixture while remaining a powder was mixed with the use of a Henschel mixer, so that a mixture 4 was obtained. Then, the mixture 4 was melted and kneaded with the use of a twin screw kneading extruder, so that a polyolefin resin composition 4 was obtained. Then, the polyolefin resin composition 4 was extruded in a sheet-like shape from a T-die which was set to 240° C. so as to obtain a sheet, and then the sheet was rolled with the use of a pair of rolls each having a surface temperature of 150° C., so that a rolled sheet 4 was prepared. Then, the rolled sheet 4 was immersed in a hydrochloric acid aqueous solution (containing 4 mol/L of hydrochloric acid and 0.5% by weight of a nonionic surfactant) so as to remove the calcium carbonate from the rolled sheet 4. Then, the resultant sheet was stretched with a stretch ratio of 6.2 times. Furthermore, the resultant sheet was heat fixed at 126° C. so that a porous base material 4 was obtained. The porous base material 4 thus obtained was designated as a nonaqueous electrolyte secondary battery separator 4.

A nonaqueous electrolyte secondary battery 4 was prepared by a method similar to the method used in Production Example 1 except that the porous base material 1 was replaced with the porous base material 4.

Comparative Example 2

A commercially available polyolefin separator was to be used as a porous base material 5 (nonaqueous electrolyte secondary battery separator 5).

A nonaqueous electrolyte secondary battery 5 was prepared by a method similar to the method used in Production Example 1 except that the porous base material 1 was replaced with the porous base material 5.

The following Table 1 shows T-die extrusion temperatures and heat fixation temperatures in Production Examples 1-3 and Comparative Example 1.

TABLE 1

|  | T-die extrusion temperature [° C.] | Heat fixation temperature [° C.] |
| --- | --- | --- |
| Production Example 1 | 250 | 123 |
| Production Example 2 | 250 | 120 |
| Production Example 3 | 250 | 110 |
| Comparative Example 1 | 240 | 126 |

[Measurement Results]

The "evaporation time", "diminution rate", and "spot diameter" of the nonaqueous electrolyte secondary battery separators 1 through 5 obtained in Production Examples 1-3 and Comparative Examples 1 and 2 were measured by the method described above. Table 2 shows the measurement results.

The cycle characteristics of the nonaqueous electrolyte secondary batteries 1 through 5 obtained in Production Examples 1 through 3 and Comparative Examples 1 and 2 were measured by the method described above. Table 2 shows the measurement results.

TABLE 2

|  | Evaporation time [s] | Diminution rate [sec/mg] | Spot diameter [mm] | Initial battery characteristic maintenance rate | Battery characteristic maintenance rate after 100 cycles |
| --- | --- | --- | --- | --- | --- |
| Production Example 1 | 178 | 17.8 | 21 | 78% | 55% |
| Production Example 2 | 151 | 15.1 | 23 | 77% | 52% |

TABLE 2-continued

|  | Evaporation time [s] | Diminution rate [sec/mg] | Spot diameter [mm] | Initial battery characteristic maintenance rate | Battery characteristic maintenance rate after 100 cycles |
|---|---|---|---|---|---|
| Production Example 3 | 204 | 20.4 | 21 | 84% | 49% |
| Comparative Example 1 | 121 | 12.1 | 20 | 60% | 37% |
| Comparative Example 2 | 219 | 21.9 | 17 | 48% | 18% |

[Conclusion]

As shown in Table 2, it was confirmed that (i) the nonaqueous electrolyte secondary battery 4 (produced in Comparative Example 1), which included the nonaqueous electrolyte secondary battery separator 4 (produced in Comparative Example 1), resulted in an "evaporation time" of less than 150 seconds, that is, a "diminution rate" of less than 15 sec/mg and (ii) such a nonaqueous electrolyte secondary battery 4 had such a significantly low initial battery characteristic maintenance rate as 60% and had such a significantly low battery characteristic maintenance rate after 100 cycles as 37%. It was also confirmed that (i) the nonaqueous electrolyte secondary battery 5 (produced in Comparative Example 2), which included the nonaqueous electrolyte secondary battery separator 5 (produced in Comparative Example 2), resulted in an "evaporation time" of more than 210 seconds, that is, a "diminution rate" of greater than 21 sec/mg and resulted in a "spot diameter" of less than 20 mm and (ii) such a nonaqueous electrolyte secondary battery separator 5 had such a significantly low initial battery characteristic maintenance rate as 48% and had such a significantly low battery characteristic maintenance rate after 100 cycles as 18%.

Meanwhile, it was confirmed that (i) the nonaqueous electrolyte secondary batteries 1 through 3 (produced in Production Examples 1 through 3, respectively), which respectively included the nonaqueous electrolyte secondary battery separators 1 through 3 (produced in Production Examples 1 through 3, respectively), resulted in "evaporation times" of 151 seconds to 204 seconds, that is, "diminution rates" of 15 sec/mg to 21 sec/mg and "spot diameters" of not less than 20 mm and (ii) such nonaqueous electrolyte secondary batteries 1 through 3 had initial battery characteristic maintenance rate of not less than 75% and had battery characteristic maintenance rates after 100 cycles of not less than 45%. This confirmed that the nonaqueous electrolyte secondary batteries 1 through 3 each had an excellent cycle characteristic.

[Various Methods for Measuring Physical Properties of Laminated Body]

In each of Examples 1 through 12 and Comparative Examples 3 through 5, crystal form α content of a PVDF-based resin contained in an obtained porous layer and a curl characteristic of an obtained laminated body were measured.

(1) Method of Calculating α Rate

An α rate (%) was measured by the method below, the α rate (%) being a molar ratio (%) of crystal form α in the PVDF-based resin contained in the porous layer in the laminated body produced in each of the Examples and Comparative Examples below with respect to the total amount of the crystal form α and crystal form β contained in the PVDF-based resin.

An 80 mm×80 mm square was cut out from the laminated body. The infrared absorption spectrum of the cutout at wave numbers from 4000 cm$^{-1}$ to 400 cm$^{-1}$ (measurement range) was measured at room temperature (approximately 25° C.) with use of an FT-IR spectrometer (available from Bruker Optics K.K.; model: ALPHA Platinum-ATR) with a resolution of 4 cm$^{-1}$ and 512 times of scanning. Then, from the spectrum measured, the absorption intensity at 765 cm$^{-1}$ (characteristic absorption of crystal form α) and the absorption intensity at 840 cm$^{-1}$ (characteristic absorption of crystal form β) were determined. The starting point and end point of a waveform formed with the wave number set as a peak were connected with a straight line, where the length between the straight line and the peak wave number (peak top) denoted an absorption intensity. For crystal form α, a maximum possible absorption intensity within the wave number range of 775 cm$^{-1}$ to 745 cm$^{-1}$ was assumed to be the absorption intensity at 765 cm$^{-1}$. For crystal form β, a maximum possible absorption intensity within the wave number range of 850 cm$^{-1}$ to 815 cm$^{-1}$ was assumed to be the absorption intensity at 840 cm$^{-1}$.

The α rate was calculated as described above in accordance with the Formula (4a) below on the basis of a value obtained by (i) determining the absorption intensity at 765 cm$^{-1}$ corresponding to crystal form α and the absorption intensity at 840 cm$^{-1}$ corresponding to crystal form β and (ii) multiplying the absorption intensity of crystal form α by 1.681 (correction factor) with reference to Japanese Patent Application Publication, Tokukai, No. 2005-200623.

$$\alpha \text{ rate } (\%)=[1-\{\text{absorption intensity at 840 cm}^{-1}/(\text{absorption intensity at 765 cm}^{-1}\times\text{correction factor }(1.681)+\text{absorption intensity at 840 cm}^{-1})\}]\times 100 \quad (4a)$$

(2) Curl Measurement

An 8 cm×8 cm square was cut out from the laminated body. The cutout was kept at room temperature (approximately 25° C.) and at a dew point of −30° C. for one (1) day. The appearance of the cutout was then evaluated on the basis of the following criterion: The "C" represents a state of a complete curl, the "A" and "B" each represent a better state, and the "A" represents the most preferable state.

A: No curved ends

B: Although an end(s) is curved, the remaining portion is mostly not curved and is flat.

C: Opposite ends curved into a tube shape

Example 1

An N-methyl-2-pyrrolidone (hereinafter referred to also as "NMP") solution (available from Kureha Corporation; product name: L#9305, weight-average molecular weight: 1,000,000) containing a PVDF-based resin (polyvinylidene fluoride-hexafluoropropylene copolymer) was prepared as a coating solution. The coating solution was applied by a doctor blade method to the porous base material produced in Production Example 1 so that the applied coating solution weighed 6.0 g per square meter of the PVDF-based resin in the coating solution. The porous film, to which the coating solution had been applied, was immersed into 2-propanol while the coating film was wet with the solvent, and was then left to stand still at 25° C. for 5 minutes. This produced a laminated porous film (1-*i*). The laminated porous film (1-*i*) produced was further immersed into other 2-propanol while the laminated porous film (1-*i*) was wet with the above immersion solvent, and was then left to stand still at 25° C. for 5 minutes. This produced a laminated porous film (1-*ii*). The laminated porous film (1-*ii*) produced was dried at 65° C. for 5 minutes. This produced a laminated body (1). Table 3 shows the results of evaluation of the laminated body (1).

Example 2

A laminated body (2) was prepared by a method similar to the method used in Example 1 except that the porous base material prepared in Production Example 2 was used. Table 3 shows the results of evaluation of the laminated body (2).

Example 3

A laminated body (3) was prepared by a method similar to the method used in Example 1 except that the porous base material prepared in Production Example 3 was used. Table 3 shows the results of evaluation of the laminated body (3).

Example 4

A porous film to which a coating solution had been applied as in Example 1 was immersed into 2-propanol while the coating film was wet with the solvent, and was then left to stand still at 0° C. for 5 minutes. This produced a laminated porous film (4-*i*). The laminated porous film (4-*i*) produced was further immersed into other 2-propanol while the laminated porous film (4-*i*) was wet with the above immersion solvent, and was then left to stand still at 25° C. for 5 minutes. This produced a laminated porous film (4-*ii*). The laminated porous film (4-*ii*) produced was dried at 30° C. for 5 minutes. This produced a laminated body (4). Table 3 shows the results of evaluation of the laminated body (4).

Example 5

A porous film to which a coating solution had been applied as in Example 2 was treated by a method similar to the method used in Example 4. This produced a laminated body (5). Table 3 shows the results of evaluation of the laminated body (5).

Example 6

A porous film to which a coating solution had been applied as in Example 3 was treated by a method similar to the method used in Example 4. This produced a laminated body (6). Table 3 shows the results of evaluation of the laminated body (6).

Example 7

A porous film to which a coating solution had been applied as in Example 1 was immersed into 2-propanol while the coating film was wet with the solvent, and was then left to stand still at −5° C. for 5 minutes. This produced a laminated porous film (7-*i*). The laminated porous film (7-*i*) produced was further immersed into other 2-propanol while the laminated porous film (7-*i*) was wet with the above immersion solvent, and was then left to stand still at 25° C. for 5 minutes. This produced a laminated porous film (7-*ii*). The laminated porous film (7-*ii*) produced was dried at 30° C. for 5 minutes. This produced a laminated body (7). Table 3 shows the results of evaluation of the laminated body (7).

Example 8

A porous film to which a coating solution had been applied as in Example 2 was treated by a method similar to the method used in Example 7. This produced a laminated body (8). Table 3 shows the results of evaluation of the laminated body (8).

Example 9

A porous film to which a coating solution had been applied as in Example 3 was treated by a method similar to the method used in Example 7. This produced a laminated body (9). Table 3 shows the results of evaluation of the laminated body (9).

Example 10

A porous film to which a coating solution had been applied as in Example 1 was immersed into 2-propanol while the coating film was wet with the solvent, and was then left to stand still at −10° C. for 5 minutes. This produced a laminated porous film (10-*i*). The laminated porous film (10-*i*) produced was further immersed into other 2-propanol while the laminated porous film (10-*i*) was wet with the above immersion solvent, and was then left to stand still at 25° C. for 5 minutes. This produced a laminated porous film (10-*ii*). The laminated porous film (10-*ii*) produced was dried at 30° C. for 5 minutes. This produced a laminated body (10). Table 3 shows the results of evaluation of the laminated body (10).

Example 11

A porous film to which a coating solution had been applied as in Example 2 was treated by a method similar to the method used in Example 10. This produced a laminated body (11). Table 3 shows the results of evaluation of the laminated body (11).

Example 12

A porous film to which a coating solution had been applied as in Example 6 was treated by a method similar to the method used in Example 10. This produced a laminated body (12). Table 3 shows the results of evaluation of the laminated body (12).

Comparative Example 3

A porous film to which a coating solution had been applied as in Example 1 was immersed into 2-propanol while the coating film was wet with the solvent, and was then left to stand still at −78° C. for 5 minutes. This produced a laminated porous film (13-*i*). The laminated porous film (13-*i*) produced was further immersed into other 2-propanol while the laminated porous film (13-*i*) was wet with the above immersion solvent, and was then left to stand still at 25° C. for 5 minutes. This produced a laminated porous film (13-ii). The laminated porous film (13-ii) produced was dried at 30° C. for 5 minutes. This produced a laminated body (13). Table 3 shows the results of evaluation of the laminated body (13).

Comparative Example 4

A porous film to which a coating solution had been applied as in Example 2 was treated by a method similar to the method used in Comparative Example 3. This produced a laminated body (14). Table 3 shows the results of evaluation of the laminated body (14).

Comparative Example 5

A porous film to which a coating solution had been applied as in Example 3 was treated by a method similar to the method used in Comparative Example 3. This produced a laminated body (15). Table 3 shows the results of evaluation of the laminated body (15).

TABLE 3

|  | α rate (%) | Curl measurement |
|---|---|---|
| Example 1 | 100 | A |
| Example 2 | 100 | A |
| Example 3 | 94 | A |
| Example 4 | 92 | A |
| Example 5 | 87 | A |
| Example 6 | 80 | A |
| Example 7 | 78 | A |
| Example 8 | 74 | A |
| Example 9 | 64 | A |
| Example 10 | 45 | A |
| Example 11 | 36 | B |
| Example 12 | 39 | A |
| Comparative Example 3 | 29 | C |
| Comparative Example 4 | 27 | C |
| Comparative Example 5 | 25 | C |

[Conclusion]

For the laminated bodies (1) to (12), which were produced in Examples 1 to 12 and each of which included a porous layer containing a PVDF-based resin that contained crystal form α in an amount (α rate) of not less than 36% with respect to the crystal form α and crystal form β combined, the measurement results show that curls were prevented. On the other hand, for the laminated bodies (13) to (15), which were produced in Comparative Examples 3 to 5 and for each of which the α rate was less than 36%, the measurement results show that clear curls occurred.

The above indicates that a laminated body in accordance with an embodiment of the present invention which laminated body has an α rate of not less than 36% is not easily curled.

The discharge rate characteristic and the cycle characteristic of a laminated body depend on the liquid retention property of the laminated body. The liquid retention property of such a laminated body depends mainly on the liquid retention property of the porous base material included therein. The laminated bodies produced in Examples 1 to 12 were each produced with use of the porous base material produced in one of Production Examples 1 to 3. As shown in Table 2, the porous base materials produced in Production Examples 1-3 each showed an excellent discharge rate characteristic and an excellent cycle characteristic. It indicates that the laminated bodies produced in Examples 1 to 12 each show an excellent discharge rate characteristic and an excellent cycle characteristic as well.

The results of Production Examples, Examples, and Comparative Examples described above show that the laminated bodies produced in Examples 1 to 12 (laminated bodies in accordance with an embodiment of the present invention) can each impart an excellent discharge rate characteristic and an excellent cycle characteristic to a nonaqueous electrolyte secondary battery including the laminated body as a separator and are not easily curled by heat generated during charge and discharge of the battery.

INDUSTRIAL APPLICABILITY

A laminated body in accordance with an embodiment of the present invention is not easily curled, and is suitably usable in production of a nonaqueous electrolyte secondary battery.

The invention claimed is:

1. A laminated body, comprising:
   a porous base material containing a polyolefin-based resin as a main component; and
   a porous layer which is disposed on at least one surface of the porous base material and which contains a polyvinylidene fluoride-based resin, wherein:
   a diminution rate of diethyl carbonate dropped on the porous base material is 15 sec/mg to 21 sec/mg;
   a spot diameter of the diethyl carbonate 10 seconds after the diethyl carbonate was dropped on the porous base material is not less than 20 mm; and
   the polyvinylidene fluoride-based resin containing crystal form α in an amount of not less than 36 mol % with respect to 100 mol % of a total amount of the crystal form α and crystal form β contained in the polyvinylidene fluoride-based resin,
   where the amount of the crystal form α is calculated from an absorption intensity at around 765 $cm^{-1}$ in an IR spectrum of the porous layer, and an amount of the crystal form β is calculated from an absorption intensity at around 840 $cm^{-1}$ in the IR spectrum of the porous layer.

2. The laminated body according to claim 1, wherein the polyvinylidene fluoride-based resin contains (i) a homopolymer of vinylidene fluoride and/or (ii) a copolymer of vinylidene fluoride and at least one monomer selected from the group consisting of hexafluoropropylene, tetrafluoroethylene, trifluoroethylene, trichloroethylene, and vinyl fluoride.

3. The laminated body according to claim 1, wherein the polyvinylidene fluoride-based resin has a weight-average molecular weight of 200,000 to 3,000,000.

4. The laminated body according to claim 1, wherein the porous layer contains a filler.

5. The laminated body according to claim 4, wherein the filler has a volume-average particle size of 0.01 μm to 10 μm.

6. A nonaqueous electrolyte secondary battery member, comprising:
   a cathode;
   a laminated body according to claim 1; and
   an anode,
   the cathode, the laminated body, and the anode being arranged in this order.

7. A nonaqueous electrolyte secondary battery, comprising as a separator a laminated body according to claim 1.

* * * * *